United States Patent
Zhang et al.

(10) Patent No.: US 11,865,647 B2
(45) Date of Patent: Jan. 9, 2024

(54) UTILIZATION OF CNC MACHINING IN COMPOSITE PART REWORK

(71) Applicant: The Boeing Company, Chicago, IL (US)

(72) Inventors: Hongda Zhang, Winnipeg (CA); Yee-Ying Chung, Winnipeg (CA); Steven Dysievick, Winnipeg (CA); Michael Victor Forster, Winnipeg (CA)

(73) Assignee: The Boeing Company, Chicago, IL (US)

( * ) Notice: Subject to any disclaimer, the term of this patent is extended or adjusted under 35 U.S.C. 154(b) by 614 days.

(21) Appl. No.: 16/818,825

(22) Filed: Mar. 13, 2020

(65) Prior Publication Data
US 2021/0283702 A1    Sep. 16, 2021

(51) Int. Cl.
 *B23K 7/06*      (2006.01)
 *B23Q 17/24*     (2006.01)
 *B23Q 15/26*     (2006.01)
 *B23Q 17/20*     (2006.01)

(52) U.S. Cl.
 CPC ........... *B23K 7/06* (2013.01); *B23Q 15/26* (2013.01); *B23Q 17/20* (2013.01); *B23Q 17/2471* (2013.01)

(58) Field of Classification Search
 CPC .......... B23K 7/06; B23Q 15/26; B23Q 17/20; B23Q 17/2471; G05B 19/401; G05B 2219/32217; G05B 2219/50209
 See application file for complete search history.

(56) References Cited

U.S. PATENT DOCUMENTS

| | | | | |
|---|---|---|---|---|
| 4,131,490 A | * | 12/1978 | Oishi | G01N 27/9093 266/51 |
| 2007/0061109 A1 | * | 3/2007 | Wilke | G06Q 10/10 702/183 |
| 2010/0135820 A1 | * | 6/2010 | Olson | B29C 73/10 416/223 R |
| 2010/0316458 A1 | * | 12/2010 | Lindgren | B29C 73/26 29/402.11 |
| 2013/0024165 A1 | * | 1/2013 | Tardu | G06F 30/15 703/1 |
| 2013/0261876 A1 | * | 10/2013 | Froom | B64F 5/00 901/44 |

(Continued)

OTHER PUBLICATIONS

FAA Order 8900.1, FSIMS, vol. 3, Chap 67, Sect 1, Dec. 8, 2021 (Year: 2021).*

(Continued)

*Primary Examiner* — Kyle R Quigley
(74) *Attorney, Agent, or Firm* — Yee & Associates, P.C.

(57) ABSTRACT

A method for repairing a composite structure is provided. A rework zone is defined on the composite structure. A theoretical scarfing bottom surface is identified for the rework zone from a model of the composite structure. An actual scarfing bottom surface in a local axis system is identified for the rework zone. Parameters for a rework program for an automated scarfing tool are modified based on deviations between the theoretical scarfing bottom surface and the actual scarfing bottom surface. Plies in the rework zone are removed using the automated scarfing tool.

20 Claims, 16 Drawing Sheets

(56) References Cited

U.S. PATENT DOCUMENTS

| | | | |
|---|---|---|---|
| 2015/0090392 A1* | 4/2015 | Bertrand | G05B 19/401 |
| | | | 156/64 |
| 2015/0273760 A1* | 10/2015 | Engelbart | G06F 30/00 |
| | | | 156/64 |
| 2016/0075028 A1* | 3/2016 | Bain | B25J 9/1684 |
| | | | 901/41 |
| 2016/0339652 A1* | 11/2016 | Safai | B29C 73/12 |
| 2018/0094525 A1* | 4/2018 | Roberts | F04D 29/542 |
| 2018/0104918 A1* | 4/2018 | Takita | B23C 1/20 |

OTHER PUBLICATIONS

FAA, Repairs and Alterations to Composite and Bonded Aircraft Structure, Jul. 23, 2016 (Year: 2016).*

Hempe, Bonded Repair Size Limits, Nov. 24, 2014 (Year: 2014).*

* cited by examiner

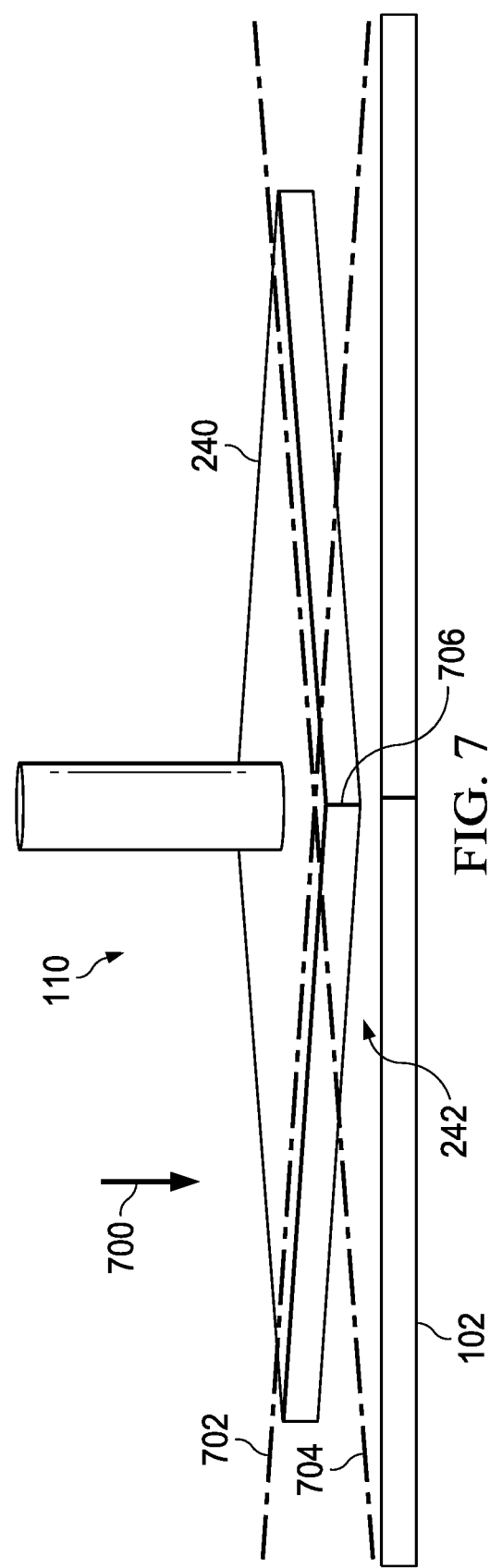

UTILIZATION OF CNC MACHINING IN COMPOSITE PART REWORK

BACKGROUND INFORMATION

1. Field

The present disclosure relates generally to repairing composite structures. More specifically, the present disclosure relates to utilization of CNC machining in composite part rework.

2. Background

Manufacturers use composite structures to provide lightweight and structurally sound parts for various applications. Increasing the efficiency of the composite manufacturing process is a priority for aircraft manufacturers. Manufacturers seek to lower costs and increase the rate at which a composite platform, such as an aircraft, is produced while minimizing the risk of rework or discarding of composite parts during the process.

Composite parts may be subject to processing defects and handling damage through the fabrication process, installation process, or thereafter. Repairs are needed to fix such damage or defect. One of the most common rework options for composite parts is taper-sanded repair, commonly known as scarf repair. During scarf repair, individual plies in the discrepant area are removed in a manner that allows new plies to be re-bonded in place of the damaged plies. The plies in the damaged area are removed in a tapered sequence. Removing and replacing the plies in this manner allows loads to be transferred between the original plies and the re-bonded repair plies.

The complexity of the composite part often dictates how difficult the repair scenario will be. For instance, with a composite part having a high curvature, or a composite part having many ply splices or boundaries, repair can become more complex or time consuming than desired. In some cases, the composite part cannot be repaired and must be discarded.

Therefore, it would be desirable to have a method and apparatus that take into account at least some of the issues discussed above, as well as other possible issues.

SUMMARY

An illustrative embodiment of the present disclosure provides a method for repairing a composite structure. A rework zone is defined on the composite structure. A theoretical scarfing bottom surface is identified for the rework zone from a model of the composite structure. An actual scarfing bottom surface in a local axis system is identified for the rework zone. Parameters for the rework program for an automated scarfing tool are modified based on deviations between the theoretical scarfing bottom surface and the actual scarfing bottom surface. Plies in the rework zone are removed using the automated scarfing tool.

Another illustrative embodiment of the present disclosure provides a composite repair system comprising an automated scarfing tool, a database, and a computer system. The automated scarfing tool is configured to remove plies in a rework zone of a composite structure. The database comprises a model of the composite structure having a theoretical scarfing bottom surface. The computer system for the rework zone is configured to identify an actual scarfing bottom surface in a local axis system. Parameters for a rework program are modified for the automated scarfing tool based on deviations between the theoretical scarfing bottom surface and the actual scarfing bottom surface.

A further illustrative embodiment of the present disclosure provides a method for repairing a composite structure. A rework zone is defined on the composite structure. The rework zone is separated into sections. A theoretical scarfing bottom surface is identified for each section of the rework zone from a model of the composite structure. Reference locations are measured in each section of the rework zone. An actual scarfing bottom surface is identified for each section of the rework zone based on measurements collected at the reference locations. Parameters for a rework program for an automated scarfing tool are modified based on deviations between the measurements collected at the reference locations.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is another illustration of an automated scarfing tool marking a tool side surface of a composite structure depicted in accordance with an illustrative embodiment;

DETAILED DESCRIPTION

Figure 1:
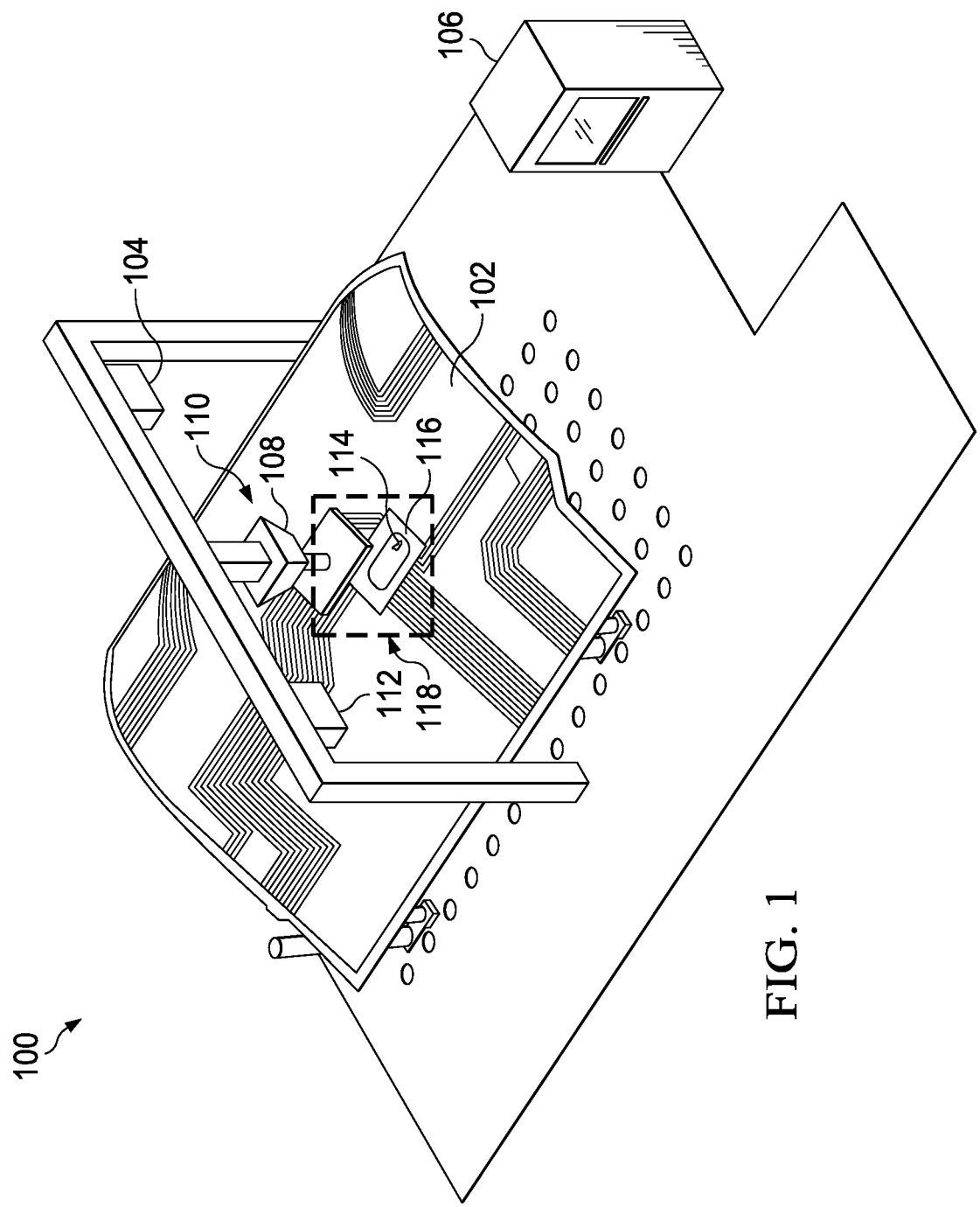
FIG. 1 is an illustration of a composite repair system in accordance with an illustrative embodiment.

The illustrative embodiments recognize and take into account one or more different considerations. For example, the illustrative embodiments recognize and take into account that current repair processes for composite parts may present challenges in efficiency and production. Currently used methods of scarf repair employ human operators. A human operator manually sands the rework zone with a tool. The human operator attempts to maintain a desired taper ratio of about 30:1 to 60:1 in most cases. Maintaining such ratio is important for the overall integrity of the repair.

The illustrative embodiments recognize and take into account that such manual scarf repair is time-consuming and difficult to manage. Composite parts with complex rework zones may get discarded because human operators face limitations. For instance, a human operator may not be able to reach the rework zone with a hand tool. A human operator also may not be able to maintain a 30:1 to 60:1 repair taper on large contoured surfaces. Ergonomic challenges may also lead a manufacturer to scrap a part instead of having the part manually repaired.

The illustrative embodiments further recognize and take into account that automated repair systems may be desirable to reduce inefficiencies and decrease the costs of composite rework. However, such systems face challenges in accurately repairing the part. For proper scarf repair, the scarfing bottom surface must be accurately located. Sanding too deep or too shallow may compromise the repair surface. Deviations in the part such warpage, shrinkage, allowable dimensional and positional tolerances of material components, and setup errors make the process even more difficult to accurately identify and maintain a scarfing bottom surface while repairing the composite part with an automated system. Milling programs are based upon a theoretical scarfing profile generated from a computer-generated model of the composite part. The theoretical scarfing profile rarely matches the actual scarfing profile, resulting in inaccuracies in the milling process. Given that the tolerances of reaching the scarfing bottom adhesive layer are so small, even a slight deviation makes overcutting or undercutting virtually inevitable.

Thus, the disclosed embodiments provide an automated method for repairing a composite structure using a CNC machine. After initial inspection, a rework zone is defined on the composite structure. A repair model is selected based on the aspect ratio of the rework zone. A theoretical scarfing bottom surface for the rework zone is identified using a model of the composite structure. An actual rework surface is identified either by rotating/translating a cutting plane in a local axis system, or by measuring reference locations in the rework zone. Parameters of the rework program is modified to account for deviations between the theoretical scarfing bottom surface and the actual scarfing bottom surface. Damaged plies are removed in the rework zone using the automated scarfing tool.

With reference now to the figures and, in particular, with reference to FIG. 1, an illustration of a perspective view of a composite repair system is depicted in accordance with an illustrative embodiment. Composite repair system 100 comprises a combination of automated components and/or devices capable of repairing damage and defects to composite structure 102.

As depicted, composite repair system 100 includes inspection system 104, computer system 106, controller 108, automated scarfing tool 110, and measurement system 112. In this illustrative example, inspection system 104 identified defect 114 in composite structure 102. Scarf repair is needed in rework zone 116. Section 118 with rework zone 116 is shown in greater detail in FIG. 3.

Figure 2:
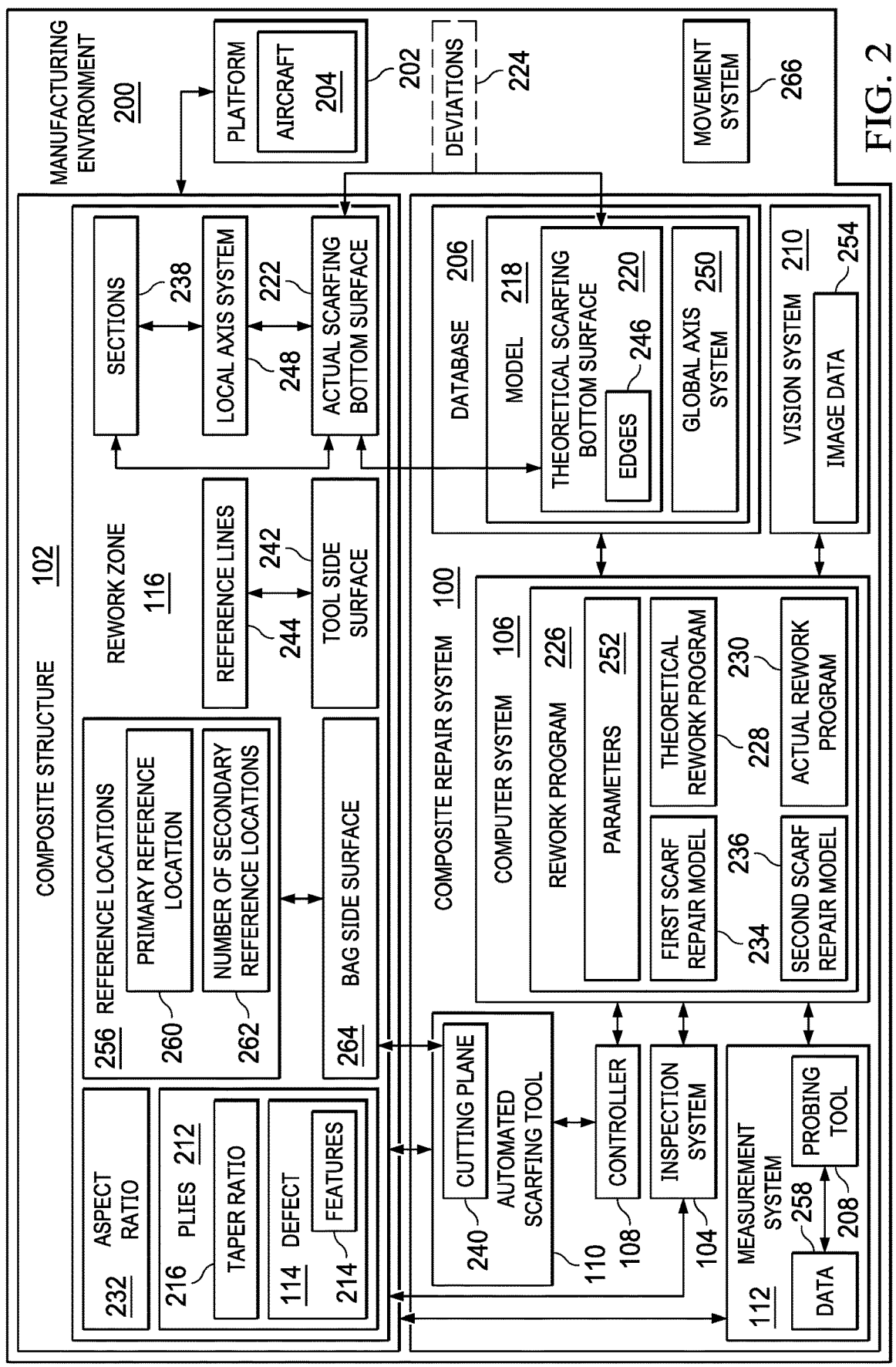
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where composite structures are fabricated, repaired, or both. Components within composite repair system 100 are used to perform repair processes on composite structure 102 in this illustrative example.

Composite structure 102 is a structure configured for use in platform 202. Platform 202 may be, for example, without limitation, a mobile platform, a stationary platform, a land-based structure, an aquatic-based structure, or a space-based structure. More specifically, platform 202 may be an aircraft, a surface ship, a tank, a personnel carrier, a train, a spacecraft, a space station, a satellite, a submarine, an automobile, a power plant, a bridge, a dam, a house, a manufacturing facility, a building, and other suitable platforms.

Platform 202 takes the form of aircraft 204 in this illustrative example. When composite structure 102 is manufactured for aircraft 204, composite structure 102 may be, for example, without limitation, a door, a panel, a stringer, a spar, a rib, a stabilizer, a skin panel, or some other suitable structure configured for use in aircraft 204.

As depicted in block form, composite repair system 100 comprises inspection system 104, computer system 106, automated scarfing tool 110 with database 206, controller 108, and measurement system 112. Measurement system 112 may include probing tool 208. Optionally, composite repair system 100 includes vision system 210. Composite repair system 100 may take the form of a computer numerical control (CNC) machine in this illustrative example.

Composite structure 102 has defect 114. Defect 114 may be, for example, without limitation, disbond, delamination, a dent, inclusion of foreign object debris or another type of inconsistency in composite structure 102. Defect 114 may be evident on the surface of composite structure 102 or may need non-destructive inspection to detect. Defect 114 may span one or more plies 212 in composite structure 102. If defect 114 spans more than one of plies 212, such plies 212 may collectively be referred to as damaged plies.

As depicted, inspection system 104 is a device configured to identify defect 114 in composite structure 102. Inspection system 104 inspects composite structure 102 after composite structure 102 is formed. Inspection system 104 is a non-destructive inspection system in this illustrative example.

Once defect 114 is located by inspection system 104, computer system 106 determines rework zone 116 for composite structure 102. Computer system 106 may include hardware, software, wireless network components, Bluetooth, and/or other suitable components. Components in computer system 106 are described in greater detail with reference to FIG. 15.

As illustrated, rework zone 116 is the physical location in composite structure 102 where repair will take place. Computer system 106 defines rework zone 116 based on features 214 of defect 114 and taper ratio 216 for the scarf repair.

Features 214 may include a combination of the size, shape, depth, and type of defect 114, as well as other properties of defect 114.

Scarfing taper ratio 216 represents the desired slope of scarf removal within rework zone 116. During removal, plies 212 in rework zone 116 are removed down to the scarfing bottom surface. Each of plies 212 is slightly bigger than the ply underneath it in order to maintain taper ratio 216. In these illustrative examples, taper ratio 216 ranges from 30:1 to 60:1. Units may be expressed in inches, but any unit of length may be used. In other illustrative examples, other ratios may be desired for taper ratio 216.

In this illustrative example, database 206 stores model 218 of composite structure 102. Model 218 of composite structure 102 is based on the digital engineering definition for composite structure 102. Based on model 218 in database 206, the location of defect 114, and taper ratio 216, computer system 106 determines theoretical scarfing bottom surface 220.

Theoretical scarfing bottom surface 220 represents the depth of the scarf repair for composite structure 102. In other words, theoretical scarfing bottom surface 220 is the minimum number of plies 212 to be removed in rework zone 116 to ensure removal of defect 114. It is desirable for theoretical scarfing bottom surface 220 to be an adhesive ply or the core top surface. A rectangular-shaped profile is normally chosen for theoretical scarfing bottom surface 220; however, other shapes may be used to define theoretical scarfing bottom surface 220, depending on the particular implementation. This surface is deemed "theoretical" as it is based on engineering model data in model 218 rather than actual measurements of rework zone 116.

As illustrated, automated scarfing tool 110 is a device configured to remove plies 212 in rework zone 116 of composite structure 102. Automated scarfing tool 110 removes plies 212 by sanding down each ply in the laminate in tapered ratio 216 to the defined scarfing bottom surface. The term "scarfing," as used herein, means sanding, cutting, milling, or otherwise removing composite material from rework zone 116 in composite structure 102.

An ongoing challenge to automated scarfing processes is accurately determining a scarfing bottom surface. The position of theoretical scarfing bottom surface 220 from model 218 of composite structure 102 may deviate from the position of actual scarfing bottom surface 222 of composite structure 102 because the as-manufactured and as-restrained part does not have the exact surface of engineering model 218. Such deviations 224 may be caused by mislocation of actual scarfing bottom surface 222, deformation of actual scarfing bottom surface 222, or both.

In this illustrative example, mislocation of actual scarfing bottom surface 222, including translation, rotation, or both, may be caused by at least one of setup errors, such as errors from the machine bed or fixture location, deformation of composite structure 102 (i.e., warpage), allowable dimensional and positional tolerances of the material and/or components in the material (core/core assembly and ply thickness), or for some other reason. Deformation of actual scarfing bottom surface 222 may be caused by at least one of warpage or other deformation of composite structure 102, allowable dimensional and positional tolerances of the material and/or components within the material, or for other reasons.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The goal of scarfing rework is to find and remove composite material to the core surface, and only to the top of the core within actual scarfing bottom surface 222. If composite repair system 100 were to rely solely on theoretical scarfing bottom surface 220 from model 218 in programming automated scarfing tool 110 to remove plies 212, under cutting or over cutting of rework zone 116 would occur. Therefore, composite repair system 100 must accurately determine actual scarfing bottom surface 222 and modify rework program 226 from theoretical rework program 228 to actual rework program 230, such that controller 108 can control automated scarfing tool 110 in a desired manner. Composite repair system 100 successfully finds the core surface of actual scarfing bottom surface 222 by measuring and compensating for deviations 224. Composite repair system 100 accomplishes this task in two ways, based on the maximum distance between two extremities of composite structure 102 and/or aspect ratio 232 of rework zone 116.

In this illustrative example, aspect ratio 232 is the ratio of the width of longitudinal edge of rework zone 116 and the maximum distance between the two extremities of composite structure 102. For example, without limitation, if the maximum distance between the two extremities of rework zone 116 is less than two feet, a first model may be used (first scarf repair model 234), regardless of the width. In this instance, global transformation of rework program 226 is utilized.

As another example, and without limitation, if the maximum distance between the two extremities of rework zone 116 is more than two feet, a second model is selected (second scarf repair model 236). If aspect ratio 232 is larger than 1:10, rework zone 116 may be split in the transverse axis. When aspect ratio 232 is low, global transformation of rework program 226 When aspect ratio 232 is high, rework zone 116 is separated into sections 238. The scarf repair model may be selected manually by a human operator or automatically based on aspect ratio 232.

As illustrated, first scarf repair model 234 utilizes a marking tool, namely, cutting plane 240 of automated scarfing tool 110 to identify actual scarfing bottom surface 222. First scarf repair model 234 is based on the assumption that tool side surface 242 of composite structure 102 is parallel to the adhesive ply that represents the desired depth for actual scarfing bottom surface 222. Thus, if cutting plane 240 of automated scarfing tool 110 is parallel to tool side surface 242 of composite structure 102, it will cut parallel to actual scarfing bottom surface 220.

In this illustrative example, automated scarfing tool 110 marks reference lines 244 parallel to the four edges 246 of theoretical scarfing bottom surface 220. In other words, automated scarfing tool 110 outlines theoretical scarfing bottom surface 220 on tool side surface 242 of composite structure 102. To accomplish this task, composite repair system 100 slowly lowers cutting plane 240 until cutting plane 240 contacts tool side surface 242 of composite structure 102 and begins marking (cutting).

Although the marking tool in this illustrative example is integrated in automated scarfing tool 110, in other illustrative examples, the marking tool may be a separate component in composite repair system 100. In such examples, the marking tool may take the form of a visual marking pen, one or more laser cutters, or some other suitable marking device.

If actual scarfing bottom surface 222 and theoretical scarfing bottom surface 220 are identical, all four edges 246 will be marked (cut) on tool side surface 242 of composite structure 102 in rework zone 116 at the same depth. If, however, deviations 224 exist between theoretical scarfing bottom surface 220 and actual scarfing bottom surface 222, one or more edges 246 remain uncut or the depths of one or more of reference lines 244 will be different. Based on marking of reference lines 244, computer system 106 is configured to rotate and/or translate cutting plane 240 of automated scarfing tool 110 about local axis system 248 until all four edges 246 are marked (cut) at the same depth such that cutting plane 240 is parallel to tool side surface 242 of composite structure 102.

Scarf repair in these illustrative examples may be explained with reference to local axis system 248 and global axis system 250. In this illustrative example, local axis system 248 is located at the center of actual scarfing bottom surface 222. For example, without limitation, when actual scarfing bottom surface 222 is rectangular, the x-axis is parallel to the longitudinal edge and the y-axis is parallel to the transverse edge. Global axis system 250 is the machining axis system for rework program 226 for automated scarfing tool 110. The origin of global axis system 250 coincides with the center of the index pin of automated scarfing tool 110.

Based on deviations 224 between theoretical scarfing bottom surface 220 and actual scarfing bottom surface 222, computer system 106 transforms parameters 252 for rework program 226 for automated scarfing tool 110. Parameters 252 may be, for example, without limitation, at least one of tool path, cutting depth, cutting angle, cutting speed, taper ratio, tool orientation, or some other suitable parameter. In this manner, first scarf repair model 234 globally transforms the entire rework program 226.

With rework program 226 re-programmed based on actual scarfing bottom surface 222, automated scarfing tool 110 now removes plies 212 in a desired manner. For example, plies 212 may be removed in a 30:1 to 60:1 ratio.

Optionally, composite repair system 100 comprises vision system 210. Vision system 210 may include a smart camera or other suitable device configured to generate image data 254 in rework zone 116. Vision system 210 may include a dedicated processor unit to process image data 254, compare image data 254 to model image data, and send signals through communications interfaces.

In this illustrative example, second scarf repair model 236 may separate rework zone 116 into sections 238 and utilizes measurement system 112 to identify actual scarfing bottom surface 222. The number of and size of sections 238 is based on the size of rework zone 116. Second scarf repair model 236 is used, for example, when the longitudinal length of rework zone 116 is greater than two feet. Deformation in different sections 238 of rework zone 116 makes first scarf repair model 234, with global transformation of rework program 226, less desirable.

As depicted, measurement system 112 comprises a number of components configured to measure reference locations 256 in rework zone 116 of composite structure 102. Measurement system 112 may comprise at least one of a 2D camera, a laser, a sensor, a probe, or some other suitable measurement tool.

In this illustrative example, measurement system 112 includes probing tool 208. Probing tool 208 is a device configured to probe witness locations cut in composite structure 102. Measurement system 112 may include one or more additional components other than probing tool 208 in other illustrative examples.

Data 258 about reference locations 256 is generated by measurement system 112. Data 258 may include, for example, without limitation, the geometrical coordinates of reference locations 256. Data 258 is used to index each of sections 238 in rework zone 116 of composite structure 102. Based on data 258 collected at reference locations 256, computer system 106 identifies actual scarfing bottom surface 222 and local axis system 248 in each of sections 238.

For example, without limitation, automated scarfing tool 110 may cut primary reference location 260 in each of sections 238 of rework zone 116. Probing tool 208 probes primary reference location 260 to determine actual scarfing bottom surface 222.

As illustrated, a number of secondary reference locations 262 are also cut in each of sections 238 of rework zone 116. "At least a number of" when used with reference to items means one or more items. Thus, a number of secondary reference locations 262 is one or more secondary reference locations.

Probing tool 208 then probes number of secondary reference locations 262 to determine if deviations 224 exist. A number of secondary reference locations 262 are selected next to primary reference location 260. If deviations 224 exist, computer system 106 is configured to modify parameters 252 of rework program 226 to account for such deviations 224. A number of secondary reference locations 262 are cut to the same depth. Probing tool 208 probes a number of secondary reference locations 262 again. The purpose of a second probe is to determine if deviations 224 still exist. If so, deviations 224 are caused by deviations 224 of automated scarfing tool 110 at each point. Once again, computer system 106 is configured to modify parameters 252 of rework program 226 to account for such deviations 224 to more accurately cut actual scarfing bottom surface 222 in each of sections 238.

Additional witness locations may be probed, depending on the illustrative embodiment. The more witness locations that are probed, the more accurately rework program 226 will run. When using second scarf repair model 236, probing measurement occurs on bag side surface 264 of composite structure 102.

Measurement system 112 may continue to measure reference locations 262 as automated scarfing tool 110 removes plies 212 in rework zone 116. Parameters 252 for rework program 226 may be updated in real-time based on data 258 collected at references locations 256 during the removal process. In this manner, measurement system 112 generates feedback for controller 108 to more accurately guide automated scarfing tool 110.

In these illustrative examples, measurement system 112 may be implemented with the processes described in first scarf repair model 236 as well. Data 258 is inclusive of measurements, probing, image data, markings, or other suitable data collected about the position or actual scarfing bottom surface 222.

In this illustrative example, composite repair system 100 may move about manufacturing environment 200 using movement system 266. Movement system 266 includes components configured to move composite repair system 100, and automated scarfing tool 110, relative to composite structure 102 to complete rework. Movement system 266 may take the form of a gantry, a robotic arm, or some other suitable device or combination of devices. When movement system 266 takes the form of a robotic arm, automated scarfing tool 110 takes the form of an end effector of the robotic arm such that automated scarfing tool 110 is removably connected thereto.

The inclusion of ratios (1:10, 30:1, 60:1) and thresholds (two feet) are not meant to be limiting. These ratios and thresholds merely serve as examples of some of the ways the illustrative embodiments may be implemented. Other ratios and thresholds may be desirable and implemented according to an illustrative embodiment.

With an illustrative embodiment, composite parts may be more repaired more easily and quickly than with currently used manual processes and are less prone to human error. The illustrative embodiments supply a repeatable rework scenario for parts that are manufactured in the same manner and are prone to defects in the same areas of each part. Automated scarfing ensures that a desired taper ratio is maintained throughout the process without the ergonomic challenges faced by human technicians. Fewer parts are scrapped and cost savings are realized.

Figure 3:
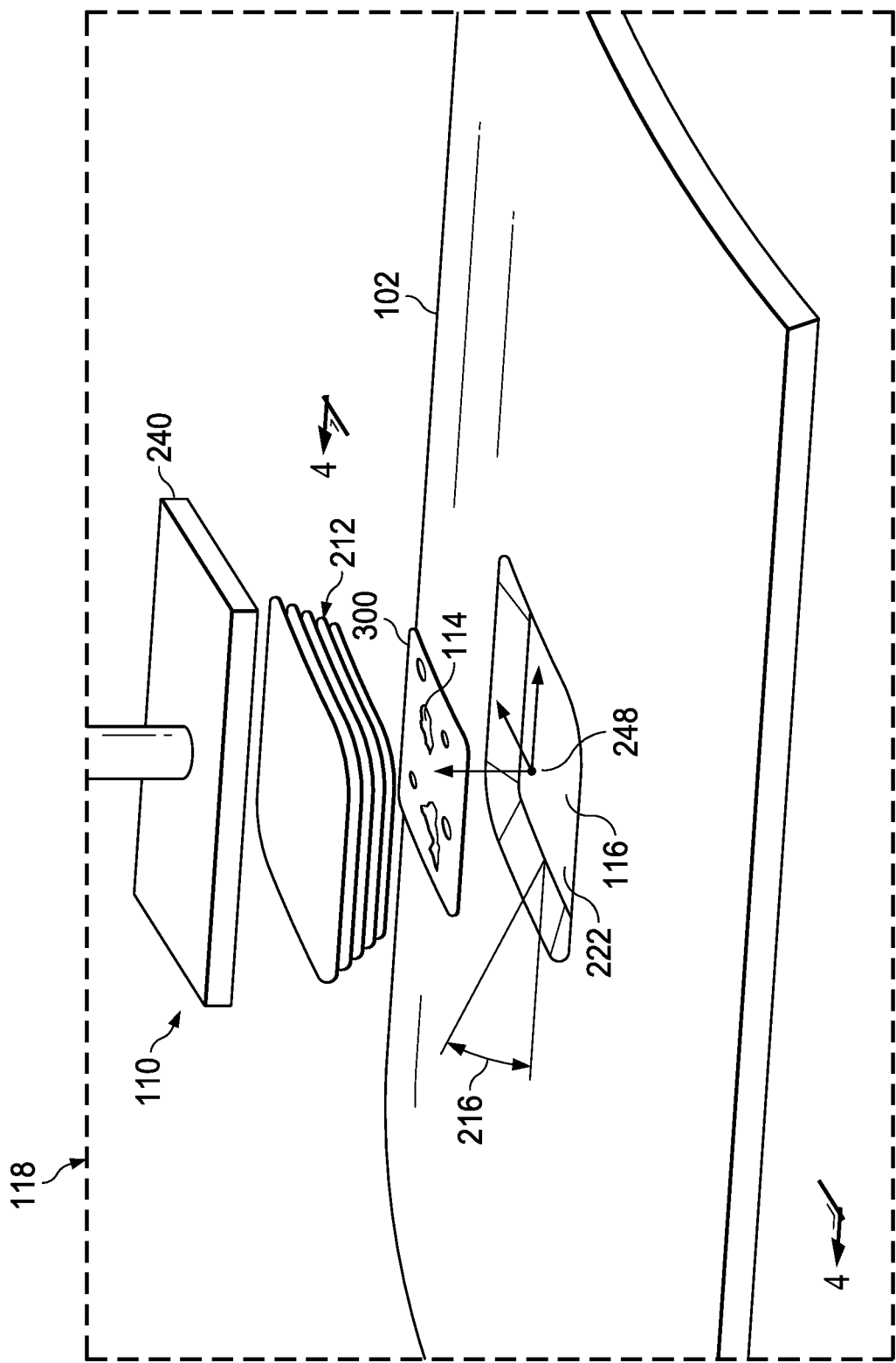
FIG. 3 is an illustration of an exploded view of a section of a composite structure with a defect in accordance with an illustrative embodiment.

FIGS. 3-8 depict the process described pursuant to first scarf repair model 234 shown in block form in FIG. 2. With reference next to FIG. 3, an illustration of an exploded view of a section of a composite structure with a defect is depicted in accordance with an illustrative embodiment. FIG. 3 illustrates an example of physical implementations of components within rework zone 116 of composite structure 102 shown in block form in FIG. 2. A more-detailed view of section 118 from FIG. 1 is shown.

As depicted, rework zone 116 has actual scarfing bottom surface 222. Defect 114 is present in damaged ply 300 of composite structure 102. Plies 212 are the plies located superficially to damaged ply 300 that will need to be removed to reach defect 114. Plies 212 are removed at taper ratio 216.

Actual scarfing bottom surface 222 has local axis system 248. Cutting plane 240 of automated scarfing tool 110 is present above rework zone 116. In order to accurately cut composite structure down to actual scarfing bottom surface 222, cutting plane 240 must be rotated and/or translated about local axis system 248 such that cutting plane 240 is parallel to actual scarfing bottom surface 222.

Figure 4:
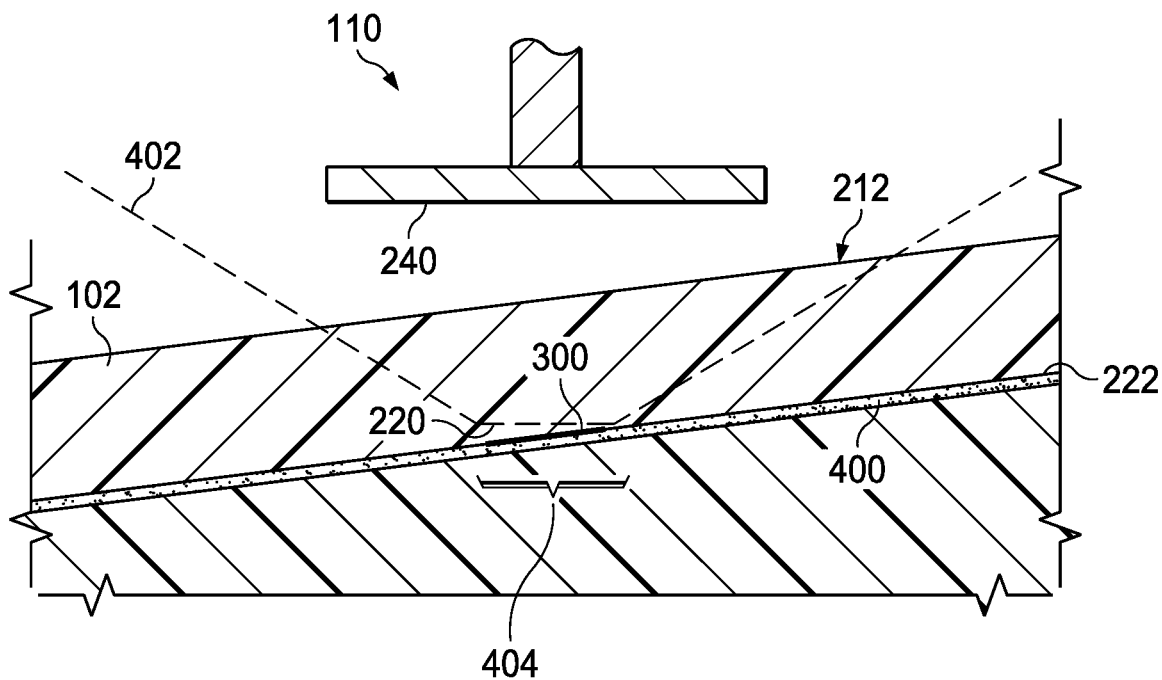
FIG. 4 an illustration of a cross-sectional view of a rework zone in accordance with an illustrative embodiment.

Turning now to FIG. 4, an illustration of a cross-sectional view of a rework zone is depicted in accordance with an illustrative embodiment. This cross-sectional view is shown along the lines 4-4 in FIG. 3.

As depicted, actual scarfing bottom surface 222 is adhesive ply 400. Adhesive ply 400 is directly underneath damaged ply 300 with defect 114 in FIG. 3. Line 402 represents the theoretical rework program profile based on a model of composite structure 102. The theoretical rework program profile has theoretical scarfing bottom surface 220. The profile of theoretical scarfing bottom surface 220 does not match the profile of actual scarfing bottom surface 222.

If automated scarfing tool 110 were to cut along the theoretical rework program profile, undercutting would occur in section 404. Currently, cutting plane 240 of automated scarfing tool 110 is parallel to theoretical scarfing bottom surface 220.

Figure 5:
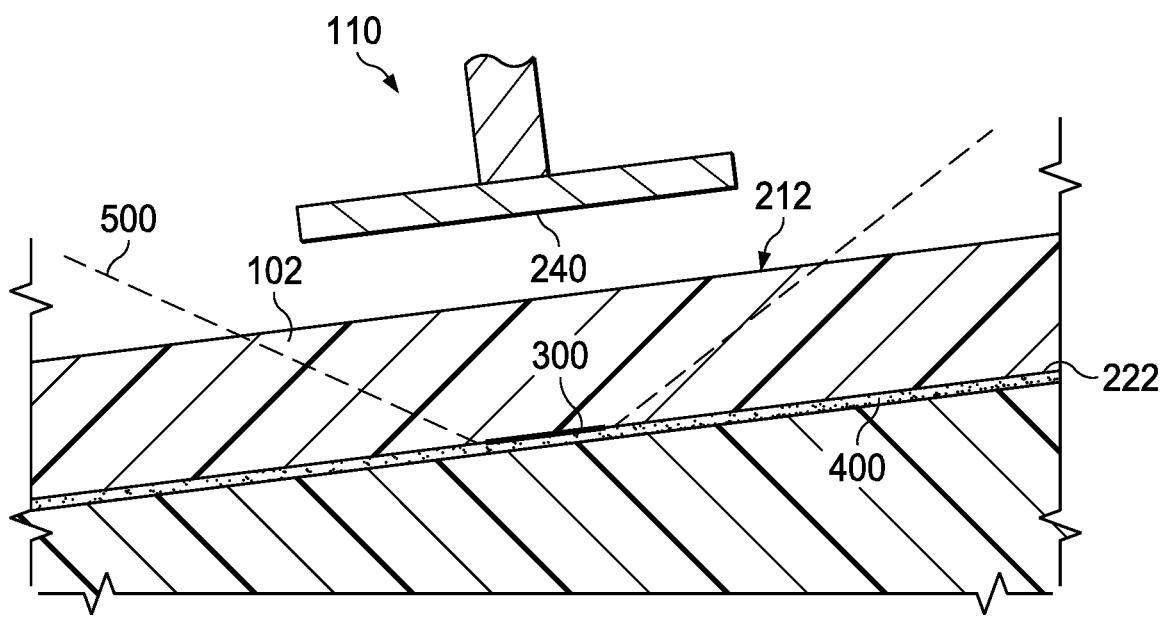
FIG. 5 is another illustration of a cross-sectional view of a rework zone in accordance with an illustrative embodiment.

FIG. 5 is another illustration of a cross-sectional view of a rework zone depicted in accordance with an illustrative embodiment. This cross-sectional view is shown along the lines 4-4 in FIG. 3. After following the method described in accordance with an illustrative embodiment, cutting plane 240 of automated scarfing tool 110 is parallel with actual scarfing bottom surface 222. Line 500 represents the adjusted rework program profile after transforming all coordinates in the tool path for automated scarfing tool 110 to compensate for deviations between theoretical scarfing bottom surface 220 shown in FIG. 4 and actual scarfing bottom surface 222. The rework program can now proceed to perform scarfing operations.

Figure 6:
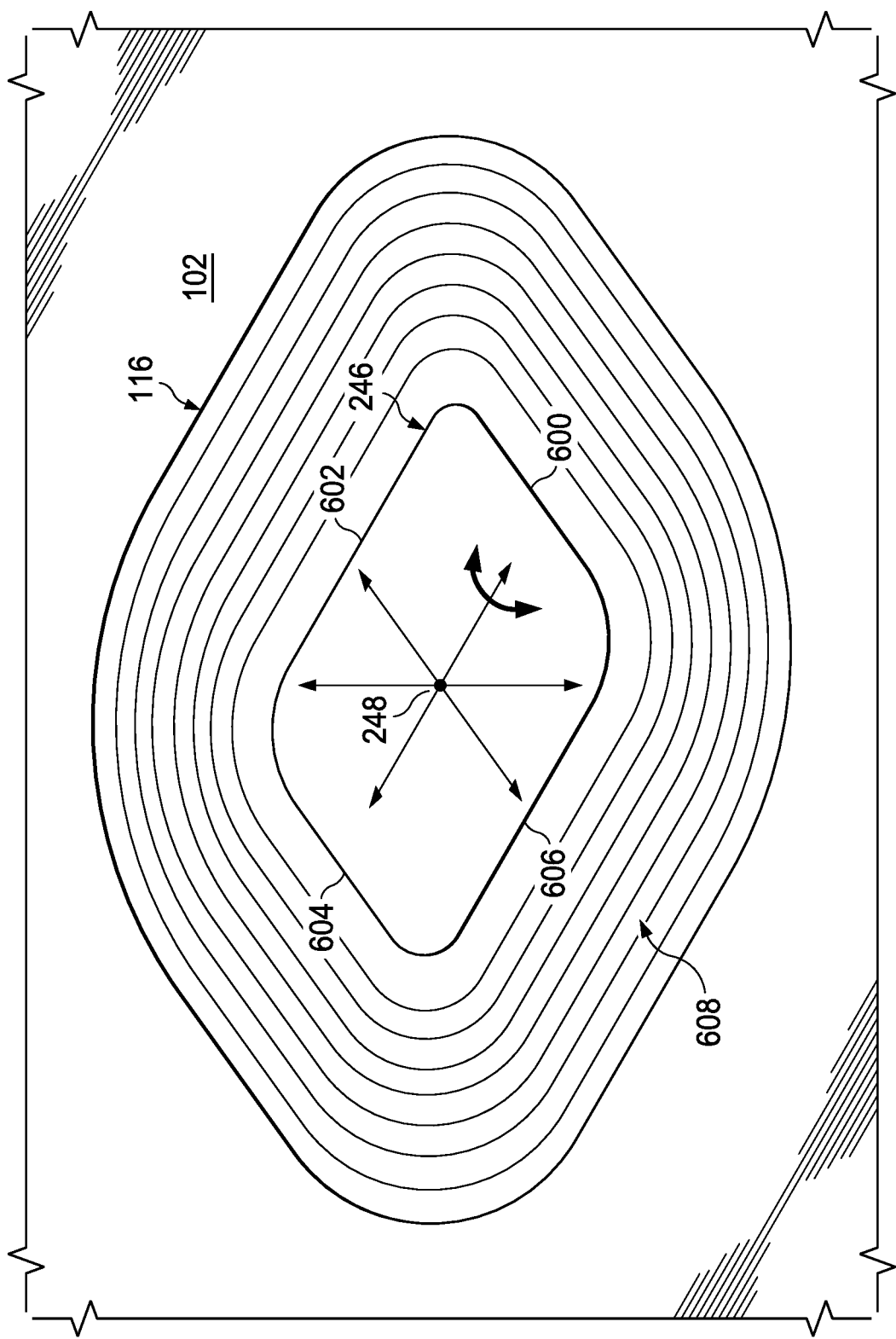
FIG. 6 is an illustration of an automated scarfing tool marking a tool side surface of a composite structure depicted in accordance with an illustrative embodiment.

FIGS. 6-8 depict an illustration of an automated scarfing tool marking a tool side surface of a composite structure in accordance with an illustrative embodiment. FIG. 6 shows actual scarfing bottom surface 222 with a rectangular profile and rounded corners. The perimeter of actual scarfing bottom surface 222 has edges 246. Edges 246 comprise edge 600, edge 602, edge 604, and edge 606. Chamfered surfaces 608 from a scarf repair profile are also seen in this view.

Prior to running the complete rework program, cutting plane 240 of automated scarfing tool 110 is lowered in the direction of arrow 700 in FIG. 7. Local x-axis 702 and local y-axis 704 are depicted in this view.

As illustrated, cutting plane 240 of automated scarfing tool 110 is not parallel to tool side surface 242 of composite structure 102. Therefore, cutting plane 240 must be rotated about one or more of local x-axis 702 or local y-axis 704. As cutting plane 240 lowers in the direction of arrow 700, corner 706 of cutting plane 240 will touch tool side surface 242 of composite structure 102 first.

Figure 8A:
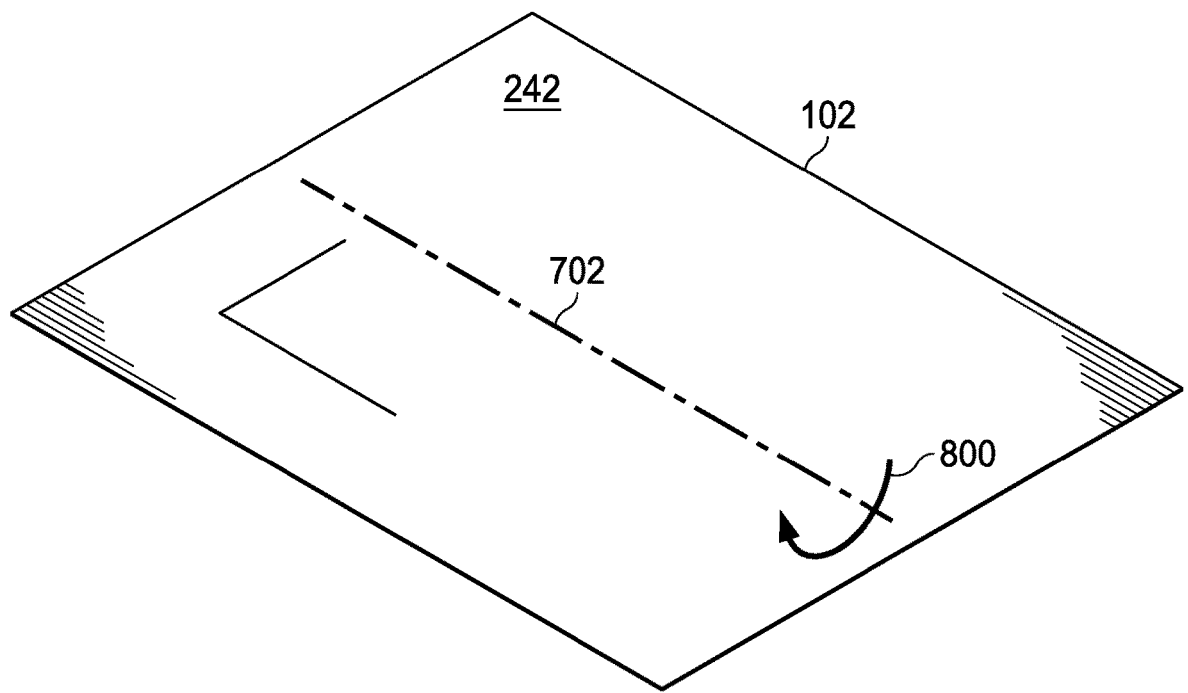
FIGS. 8A-8D are illustrations of an automated scarfing tool marking a tool side surface of a composite structure depicted in accordance with an illustrative embodiment.
Figure 8B:
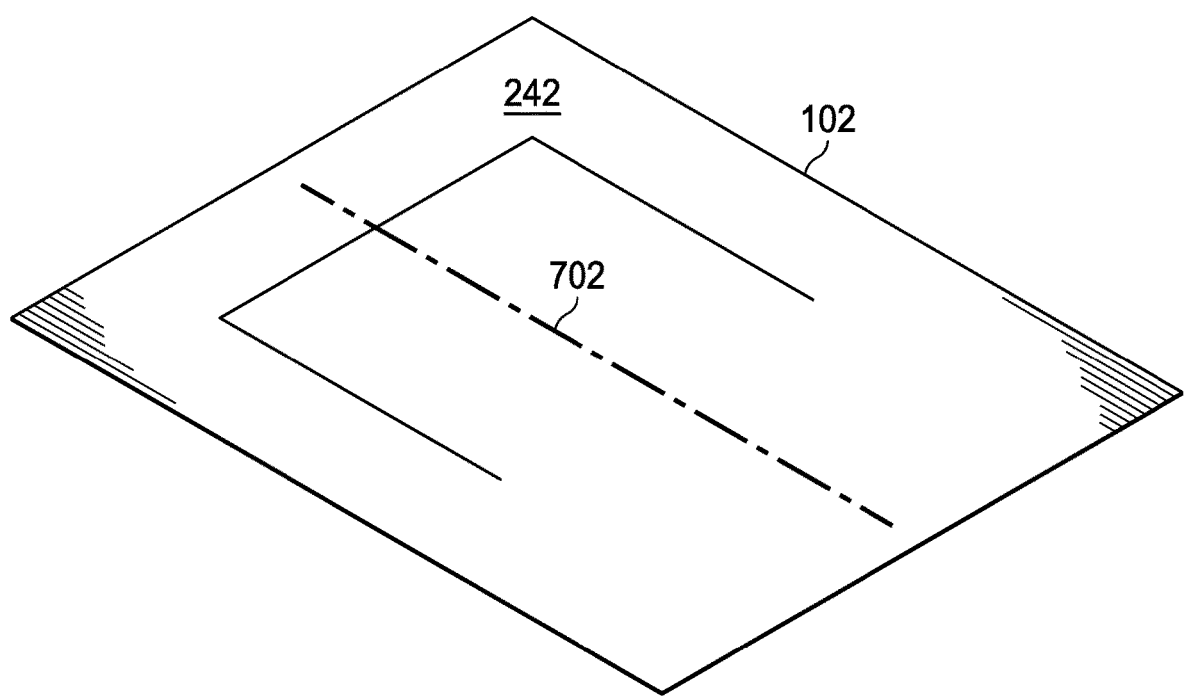
Figure 8C:
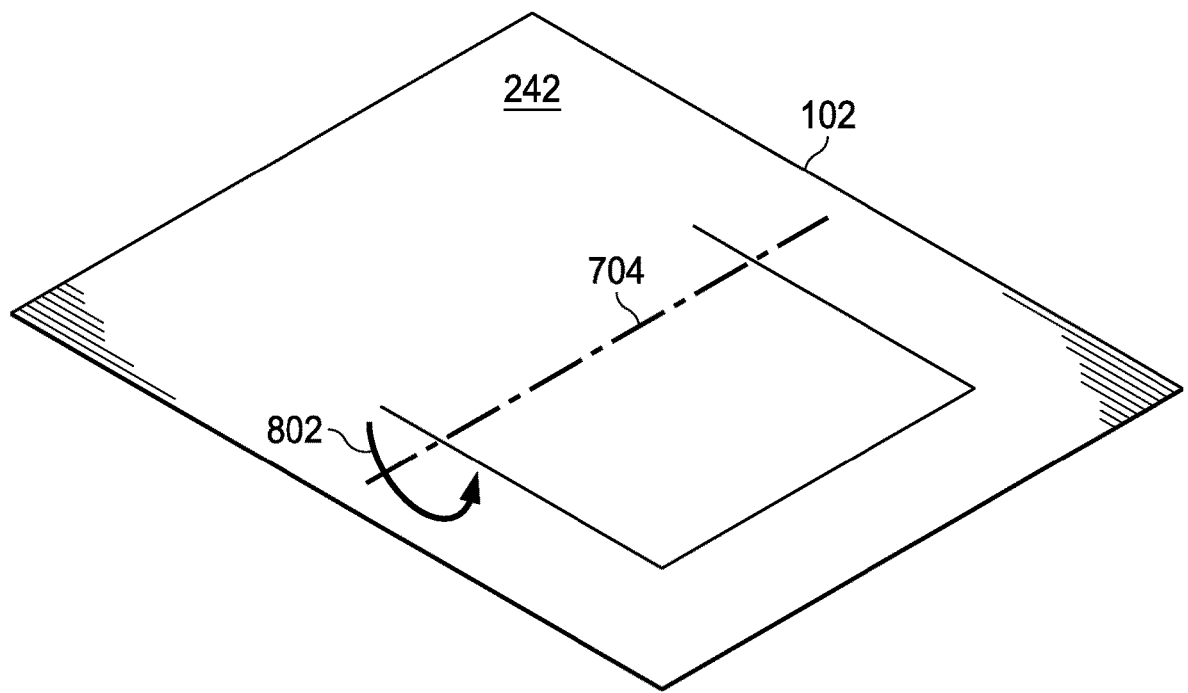
Figure 8D:
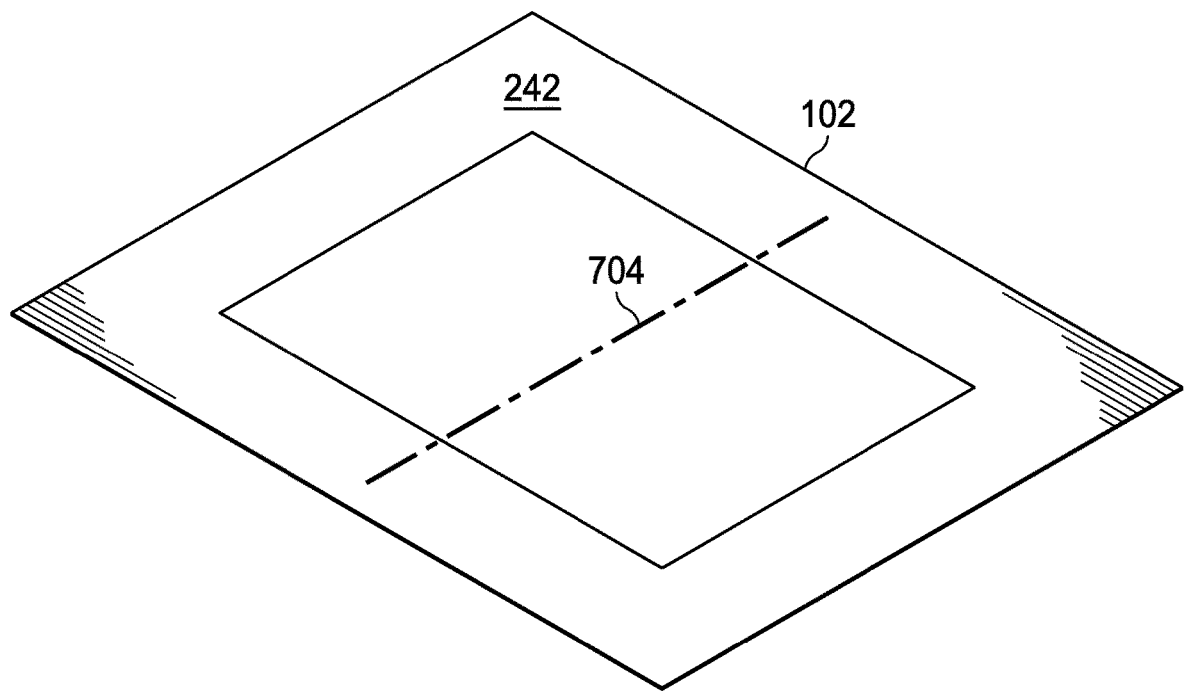

FIG. 8A corresponds with corner 706 of cutting plane 310 touching tool side surface 242 of composite structure 102. Corner 706 of FIG. 7 marks tool side surface 242. It is necessary to rotate cutting plane 240 about local x-axis 702 in the direction of arrow 800 and local y-axis 704 in the direction of arrow 802 until all four edges 246 (600, 602, 604, 606) are marked as shown in FIG. 8D.

For example, without limitation, once corner 706 of cutting plane 240 touches tool side surface 242 of composite structure 102 at a point of contact, cutting plane 240 is then rotated along the axis which is at the center of the cutting plane 240 until the other side makes contact with the part. The controller for automated scarfing tool 110 returns the angle to the opposite rotation direction by an amount equal to half of the total angle rotated from original to position cutting plane 240 parallel to tool side surface 242 of composite structure 102.

Once the proper orientation of automated scarfing tool 110 is found, computer system 106 in FIG. 1 uses the following equations to transform a tool path for the rework program:

The overall transformation matrix for any point on the rework tool path is:

$$[T]=[D]^{-1}[R_x]^{-1}[R_y]^{-1}[R_z^\theta][R_y][R_x][D],$$

After transformation of the original point $P_1$, the coordinates of any point $P_2$ is:

$$P_2=[T]P_1$$

The translation matrix between the local work axis system and the global work axis system is:

$$[D] = \begin{bmatrix} 1 & 0 & 0 & -x_0 \\ 0 & 1 & 0 & -y_0 \\ 0 & 0 & 1 & -z_0 \\ 0 & 0 & 0 & 1 \end{bmatrix}$$

The rotation matrix along the local X axis is:

$$[R_x] = \begin{bmatrix} 1 & 0 & 0 & 0 \\ 0 & \frac{C}{V} & -\frac{B}{V} & 0 \\ 0 & \frac{B}{V} & \frac{C}{V} & 0 \\ 0 & 0 & 0 & 1 \end{bmatrix}, \text{ where } V = \sqrt{B^2 + C^2}$$

The rotation matrix along the local Y axis is:

$$[R_y] = \begin{bmatrix} \frac{V}{L} & 0 & -\frac{A}{L} & 0 \\ 0 & 1 & 0 & 0 \\ \frac{A}{L} & 0 & \frac{V}{L} & 0 \\ 0 & 0 & 0 & 1 \end{bmatrix}, \text{ where } L = \sqrt{A^2 + B^2 + C^2}$$

The rotation matrix along the local Z axis is:

$$[R_z] = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

$$[R_x]^{-1} = \begin{bmatrix} 1 & 0 & 0 & 0 \\ 0 & \frac{C}{V} & \frac{B}{V} & 0 \\ 0 & -\frac{B}{V} & \frac{C}{V} & 0 \\ 0 & 0 & 0 & 1 \end{bmatrix},$$

$$[R_y]^{-1} = \begin{bmatrix} \frac{V}{L} & 0 & \frac{A}{L} & 0 \\ 0 & 1 & 0 & 0 \\ -\frac{A}{L} & 0 & \frac{V}{L} & 0 \\ 0 & 0 & 0 & 1 \end{bmatrix},$$

$$[D]^{-1} = \begin{bmatrix} 1 & 0 & 0 & x_0 \\ 0 & 1 & 0 & y_0 \\ 0 & 0 & 1 & z_0 \\ 0 & 0 & 0 & 1 \end{bmatrix}$$

Using the above-referenced equations and matrices, computer system 106 in FIG. 1 converts the entire rework program. By inputting the rotation angles and translation distance along local axis system 248, the transformed rework program in the global work axis system is calculated automatically. Automated scarfing tool 110 now commences repair of rework zone 116.

Figure 9:
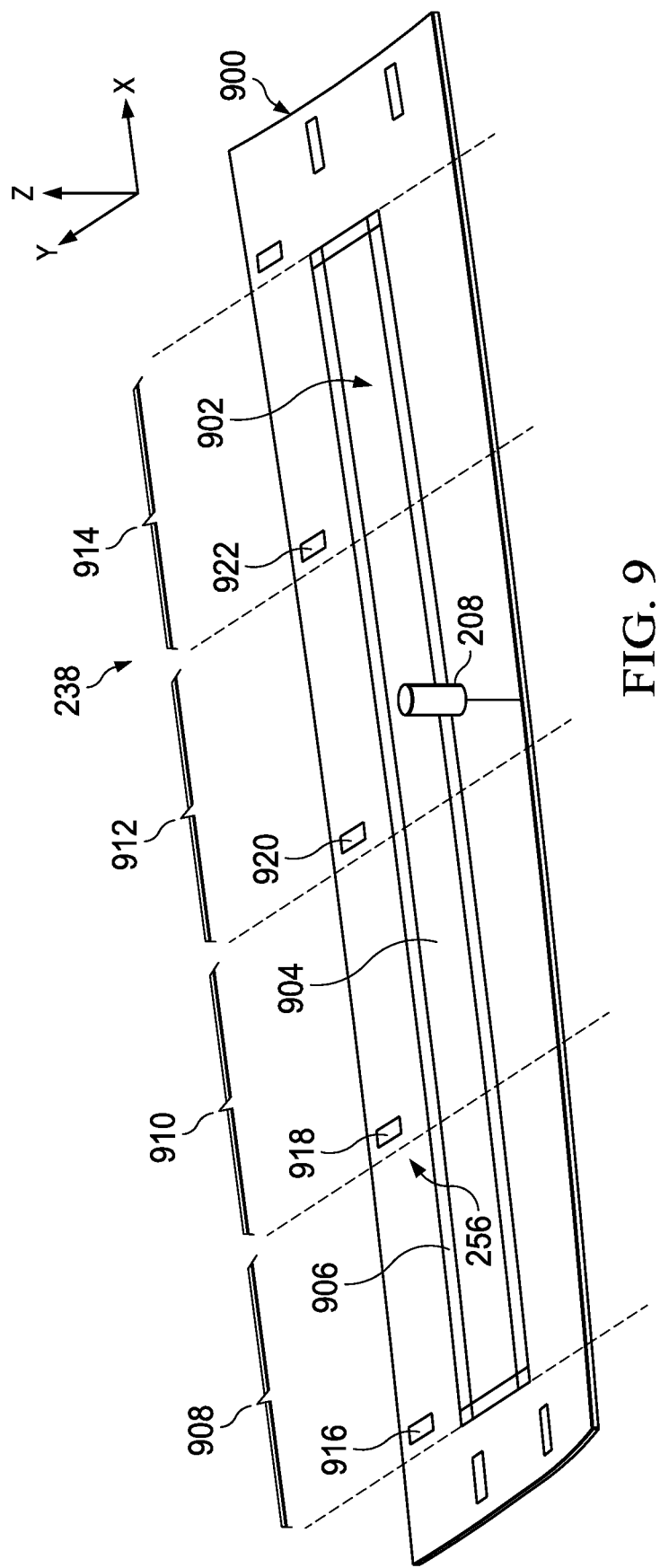
FIG. 9 is an illustration of a perspective view of a composite structure with a defect depicted in accordance with an illustrative embodiment.

FIG. 9 and FIGS. 10A-10C depict the process described pursuant to second scarf repair model 236 shown in block form in FIG. 2. Turning next to FIG. 9, an illustration of a perspective view of a composite structure with a defect is depicted in accordance with an illustrative embodiment.

As depicted, composite structure 900 has rework zone 902 with scarfing bottom surface 904 and taper ratio 906. Rework zone 902 is the physical location in composite structure 900 where repair will take place. The aspect ratio of rework zone 902 is much larger than the aspect ratio of rework zone 116 shown in FIG. 3. Deformations in composite structure 900 along the longitudinal edge of rework zone 902 necessitate a different model than that described with reference to FIGS. 6-8.

Rework zone 902 is divided into sections 238. Sections 238 comprise section 908, section 910, section 912, and section 914 in this illustrative example. Each section has a local axis system and an actual scarfing bottom surface. Although four sections are depicted in FIG. 9, rework zone 902 may be divided into two sections, three sections, five sections, or some other number of sections.

In this illustrative example, rework zone 902 has reference locations 256. Reference location 256 comprises reference location 916 in section 908, reference location 918 in section 910, reference location 920 in section 912, and reference location 922 in section 914. Reference locations 916, 918, 920, and 922 are primary reference locations (260 in FIG. 2) for each section, respectively, where the final scarf surface was exposed. Probing tool 208 probes primary reference locations 916, 918, 920, and 922.

Figure 10A:
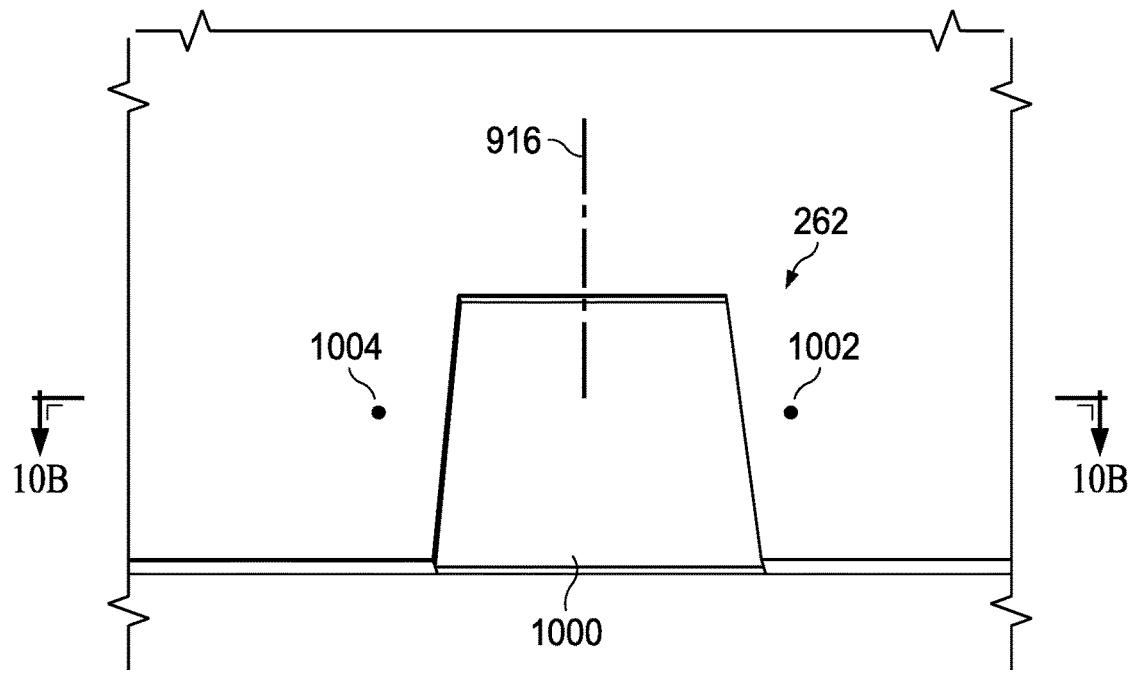
FIG. 10A-10C are illustrations of a probing program depicted in accordance with an illustrative embodiment.
Figure 10B:
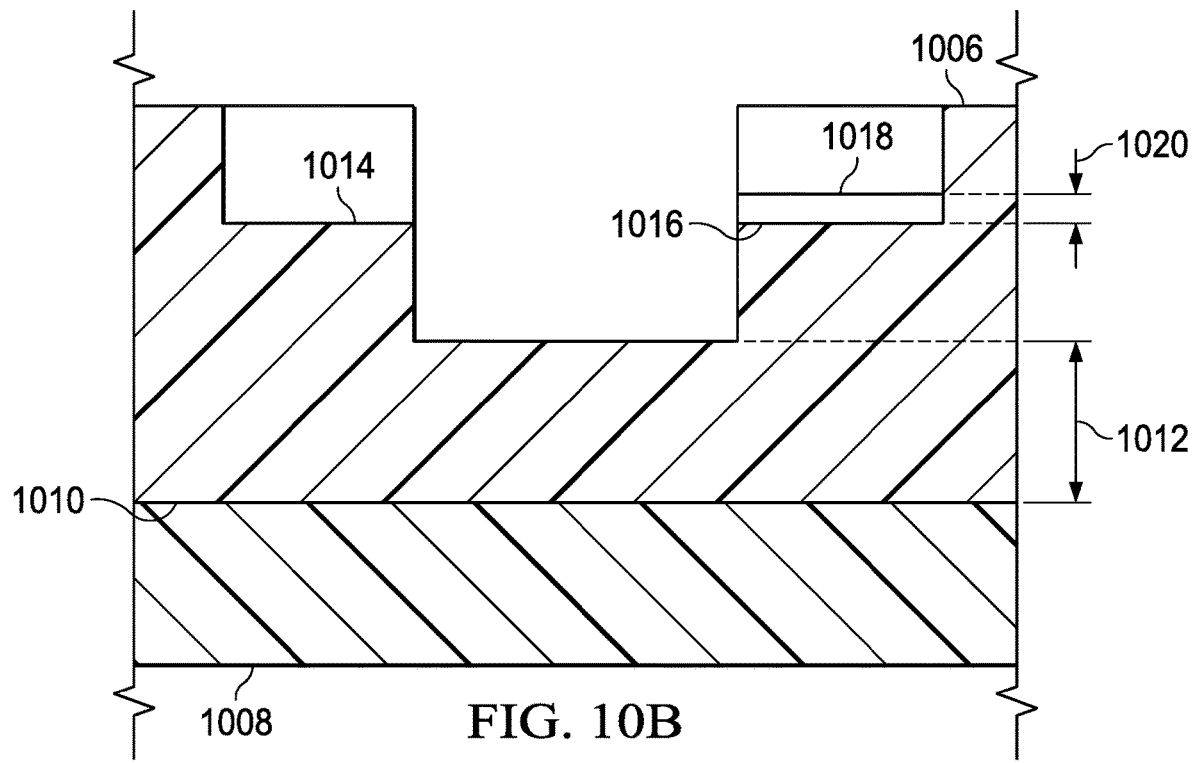
Figure 10C:
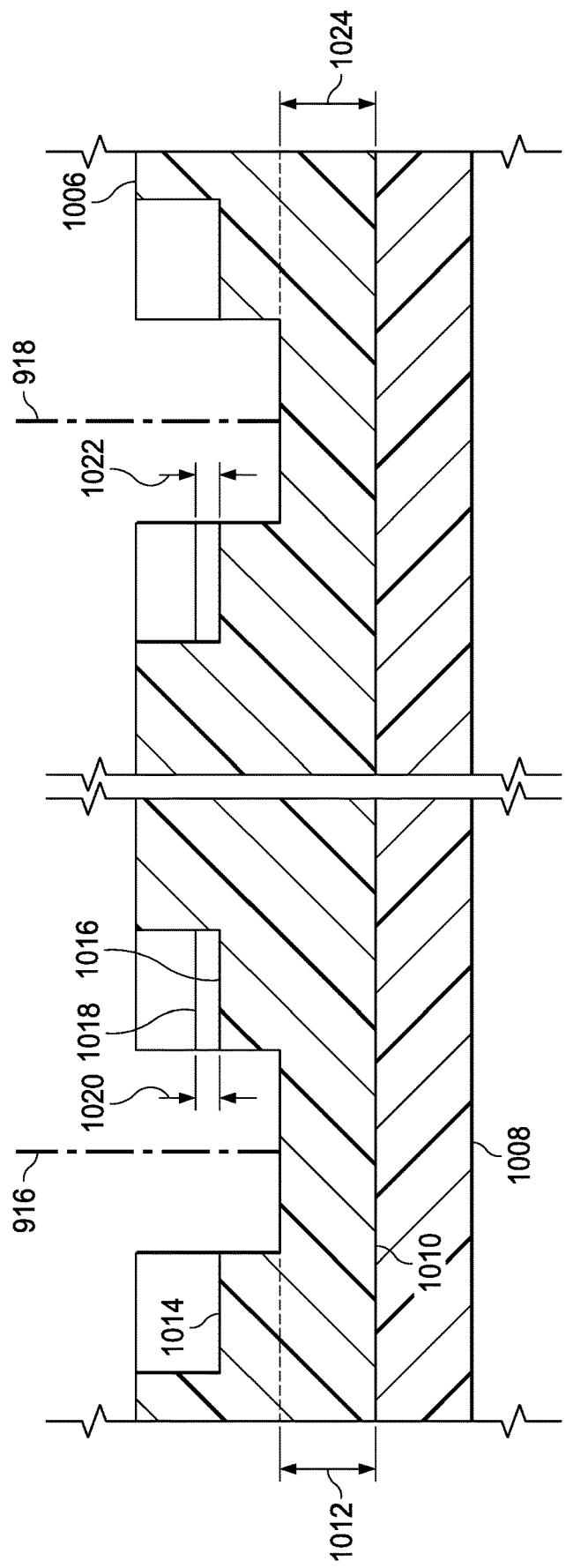

With reference next to FIGS. 10A-10C, illustrations of a probing program are depicted in accordance with an illustrative embodiment. In FIG. 10A, primary reference location 916 is milled to the actual target surface 1000.

Number of secondary reference locations 262 are selected. Secondary reference location 1002 and secondary reference location 1004 are selected adjacent to primary reference location 916.

FIG. 10B shows a cross-sectional view of primary reference location 916, secondary reference location 1002 and secondary reference location 1004 taken along lines 10B-10B in FIG. 10A. All reference locations are milled from bag side surface 264 opposite tool side surface 242. Theoretical scarfing surface 1010 differs from actual target surface 1000. Primary reference location 916 is probed to get deviation 1012 in FIG. 10B between the theoretical scarfing bottom surface and the actual scarfing bottom surface in this illustrative example.

Secondary reference location 1002 and secondary reference location 1004 are milled to target depth 1016 and target depth 1014, respectively. Depth 1014 and depth 1016 should be the same depth; however, cutter geometry discrepancies result in secondary reference location 1004 being milled to target depth 1014 while secondary reference location 1002 is only milled to depth 1018, resulting in deviation 1020. The computer system accounts for deviation 1012 and deviation 1020 when modifying parameters for the rework program for the automated scarfing tool for composite structure 900.

For example, without limitation, the computer program adjusts tool length for each tool path based on the deviations shown in FIG. 10C between two primary reference locations in composite structure 900. The deviation at each secondary reference location is added to or subtracted from the primary reference location deviation in order for the cutter to reach the actual final scarf surface.

Tool Length Adjustment (TLA) for each cutter tool path may be expressed with the following equation:

$$(D_1 - d_1) + \frac{(n-1)*[(D_2 - d_2) - (D_1 - d_1)]}{(N-1)}$$

where N is the total number of cut paths between reference location 916 and reference location 918, including cuts at reference location 916 and reference location 918, and where n is the current number of cuts starting at reference location 916. For example, without limitation, if N=100, at n=1, TLA=$(D_1-d_1)$. When n=10, $$TLA = (D_1 - d_1) + \frac{9*[(D_2 - d_2) - (D_1 - d_1)]}{99}.$$

When n=100, TLA=$(D_2-d_2)$. In the above-referenced equations, $D_1$ is 1012, $d_1$ is 1020, $D_2$ is 1024, and $d_2$ is 1022.

In each sub-section of the part divided by two primary probe points, the required scarf final surface can be milled by distributing the difference total deviation values (1012, 1024) between the two primary reference locations (916, 918) along the length of the section by varying the tool length of each individual tool path, as illustrated by FIG. 10C.

The different components shown in FIG. 1 and FIGS. 3-10 may be combined with components in FIG. 2, used with components in FIG. 2, or a combination of the two. Additionally, some of the components in FIG. 1 and FIGS. 3-10 may be illustrative examples of how components shown in block form in FIG. 2 may be implemented as physical structures.

Other configurations of composite repair system 100 may be implemented other than those shown in FIG. 1 and FIGS. 3-10. The configurations described herein are not meant to be limited as to the placement, orientation, type, or configuration of any component in composite repair system 100.

Figure 11:
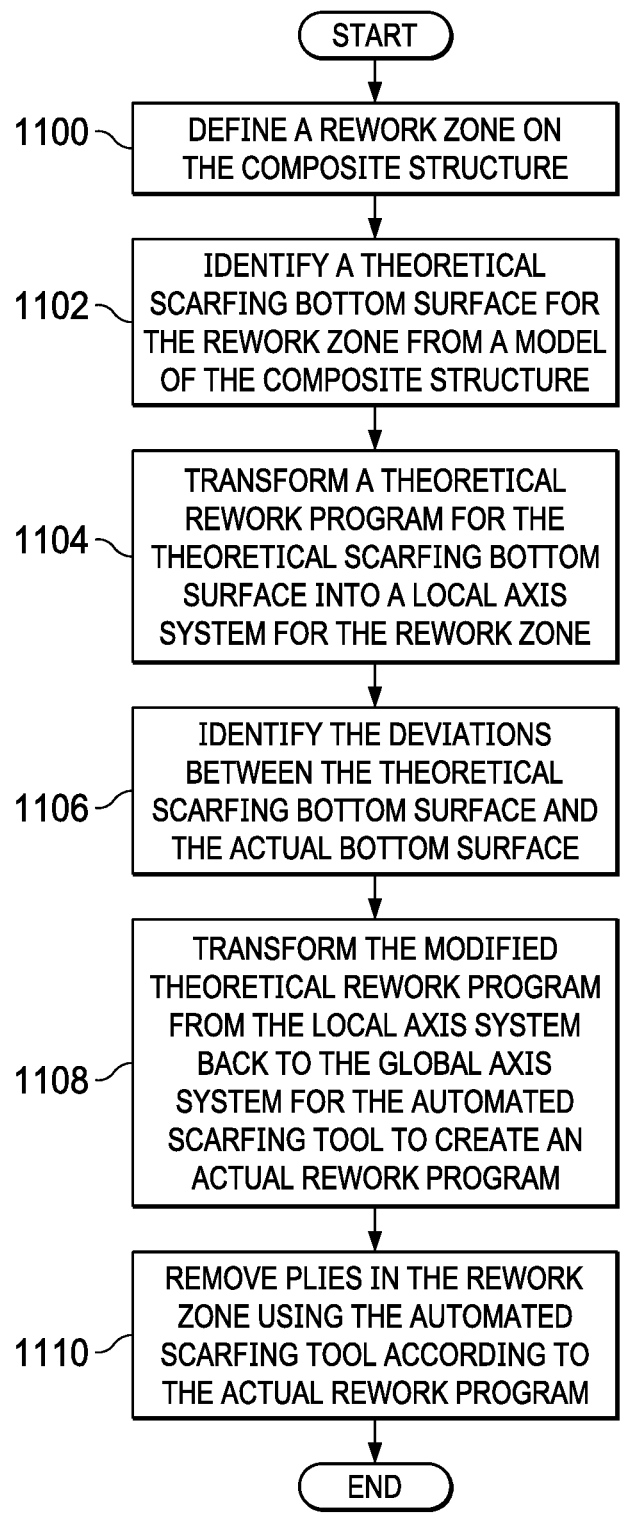
FIG. 11 is an illustration of a flowchart of a process for repairing a composite structure in accordance with an illustrative embodiment.

With reference next to FIG. 11, an illustration of a flowchart of a process for repairing a composite structure is depicted in accordance with an illustrative embodiment. The method depicted in FIG. 11 may be used by composite repair system 100 to repair defect 114 in composite structure 102 in FIG. 2.

The process begins by defining a rework zone on the composite structure (operation 1100). Next, the process identifies a theoretical scarfing bottom surface for the rework zone from a model of the composite structure (operation 1102). A theoretical rework program for the theoretical scarfing bottom surface is transformed into a local axis system for the rework zone (operation 1104). Next, the deviations between the theoretical scarfing bottom surface and the actual bottom surface are identified (operation 1106). Once the deviations are identified, the process then transforms the modified theoretical rework program from the local axis system back to the global axis system for the automated scarfing tool to create an actual rework program (operation 1108). Plies in the rework zone are removed using the automated scarfing tool according to the actual rework program (operation 1110), with the process terminating thereafter.

Figure 12:
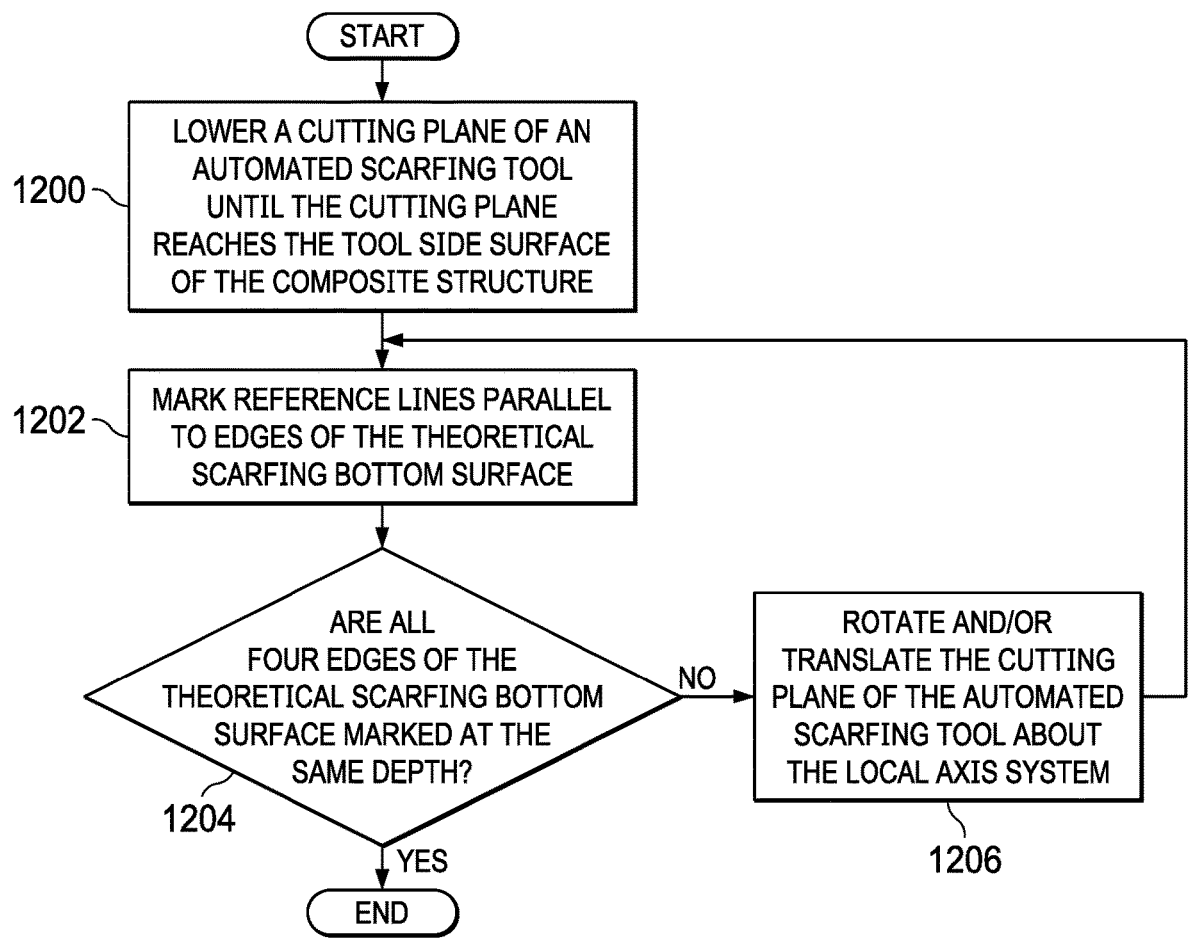
FIG. 12 is an illustration of a flowchart of a process for identifying an actual scarfing bottom surface in accordance with an illustrative embodiment.

Turning to FIG. 12, an illustration of a flowchart of a process for identifying an actual scarfing bottom surface is depicted in accordance with an illustrative embodiment. The method depicted in FIG. 12 may be used during operation 1106 from FIG. 11.

The process begins by lowering a cutting plane of an automated scarfing tool until the cutting plane reaches the tool side surface of the composite structure (operation 1200). Next, the process marks reference lines parallel to edges of the theoretical scarfing bottom surface (operation 1202). A determination is then made as to whether all four edges of the theoretical scarfing bottom surface are marked at the same depth (operation 1204). If the edges are marked at the same depth, the process has identified the actual scarfing bottom and the process terminates. If not, the process then rotates and/or translates the cutting plane of the automated scarfing tool about the local axis system (operation 1206) and returns to operation 1202. The process repeats itself until all four edges are marked such that the cutting plane is parallel to the tool side surface of the composite structure.

Figures 13, 14:
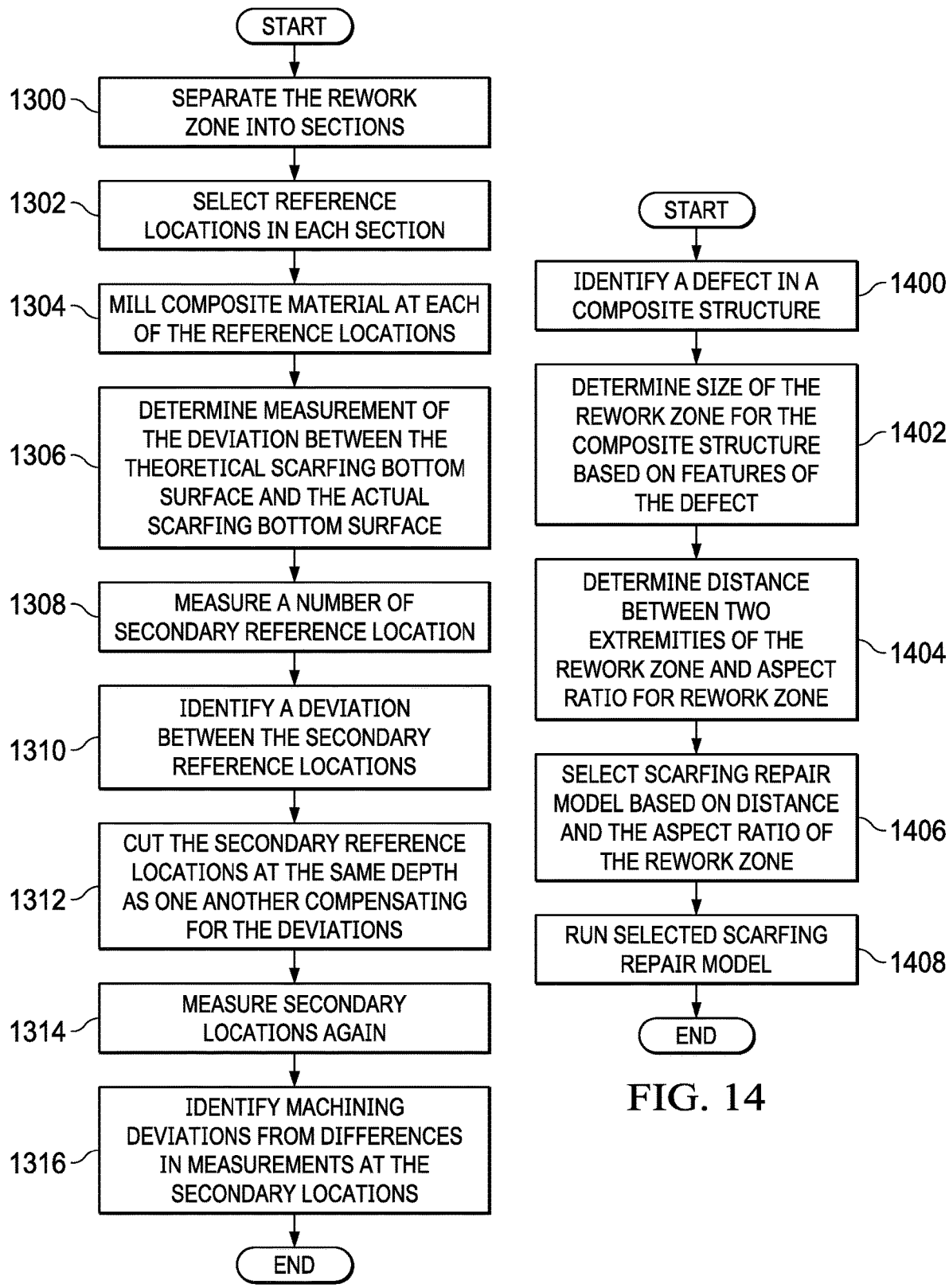
FIG. 13 is another illustration of a flowchart of a process for determining an automated scarfing repair model in accordance with an illustrative embodiment.
FIG. 14 is an illustration of a flowchart of a process for identifying an actual scarfing bottom surface in accordance with an illustrative embodiment.

With reference next to FIG. 13, an illustration of a flowchart of a process for determining an automated scarfing repair model is depicted in accordance with an illustrative embodiment. The method depicted in FIG. 13 may be used by composite repair system 100 to repair defect 114 in composite structure 102. The method described in FIG. 13 depicts second scarf repair model 268 from FIG. 2.

The process begins by separating the rework zone into sections (operation 1300). Next, reference locations are selected in each section (operation 1302).

The process then mills composite material at each of the reference locations (operation 1304). A primary reference location is measured to determine the deviation between the theoretical scarfing bottom surface and the actual scarfing bottom surface (operation 1306). A number of secondary reference locations are measured (operation 1308). A deviation between the secondary reference locations is identified (operation 1310). The secondary reference locations are cut a second time at the same depth as one another, compensating for the deviations (operation 1312). The secondary locations are measured again (operation 1314). Machining deviations are identified from differences in measurements at the secondary locations (operation 1316), with the process terminating thereafter.

In FIG. 14, an illustration of a flowchart of a process for identifying an actual scarfing bottom surface is depicted in accordance with an illustrative embodiment. The method depicted in FIG. 14 may be used by composite repair system 100 to select the appropriate scarf repair model to repair defect in composite structure 102 in FIG. 2.

The process begins by identifying a defect in a composite structure (operation 1400). The process then determines the size of the rework zone for the composite structure based on features of the defect (operation 1402).

Next, the process determines a distance between two extremities of the rework zone and an aspect ratio for the rework zone (operation 1404). A scarfing repair model is selected based on the distance and the aspect ratio of the rework zone (operation 1406). The process then runs the selected scarfing repair model (operation 1408).

Figure 15:
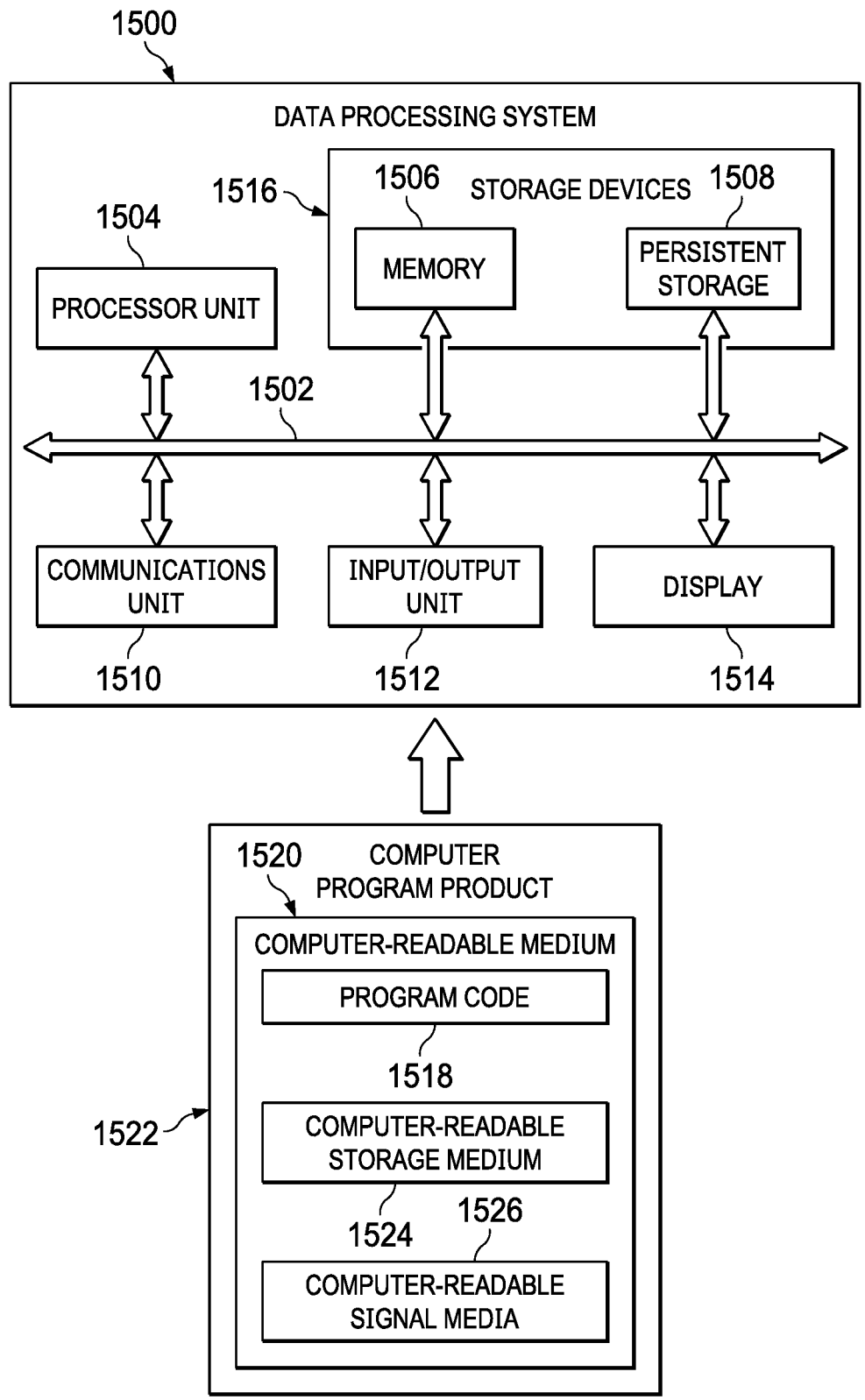
FIG. 15 is an illustration of a block diagram of a data processing system depicted in accordance with an illustrative embodiment.

Turning now to FIG. 15, an illustration of a block diagram of a data processing system is depicted in accordance with an illustrative embodiment. Data processing system 1500 is an example of one possible implementation of a data processing system for performing the functions of controller 108 and computer system 106 shown in block form in FIG. 2. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, can be, for example, a random-access memory or any other suitable volatile or non-volatile storage device. Persistent storage 1508 can take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 can provide a connection for user input through at least one of a keyboard, a mouse, or some other suitable input device. Further, input/output unit 1512 can send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which can be located in a memory, such as memory 1506.

These instructions are referred to as program code, computer usable program code, or computer-readable program code that can be read and executed by a processor in processor unit 1504. The program code in the different embodiments can be embodied on different physical or computer-readable storage medium, such as memory 1506 or persistent storage 1508.

Program code 1518 is located in a functional form on computer-readable medium 1520 that is selectively removable and can be loaded onto or transferred to data processing system 1500 for execution by processor unit 1504. Program code 1518 and computer-readable medium 1520 form computer program product 1522 in these illustrative examples. In the illustrative example, computer-readable medium 1520 is computer-readable storage medium 1524.

In these illustrative examples, computer-readable storage medium 1524 is a physical or tangible storage device used to store program code 1518 rather than a medium that propagates or transmits program code 1518. Computer readable storage medium 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1518 can be transferred to data processing system 1500 using computer-readable signal media 1526. Computer-readable signal media 1526 can be, for example, a propagated data signal containing program code 1518. For example, computer-readable signal media 1526 can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable medium 1520" can be singular or plural. For example, program code 1518 can be located in computer-readable medium 1520 in the form of a single storage device or system. In another example, program code 1518 can be located in computer-readable medium 1520 that is distributed in multiple data processing systems. In other words, some instructions in program code 1518 can be located in one data processing system while other instructions in in program code 1518 can be located in one data processing system. For example, a portion of program code 1518 can be located in computer-readable medium 1520 in a server computer while another portion of program code 1518 can be located in computer-readable medium 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, can be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program code 1518.

Figure 16:
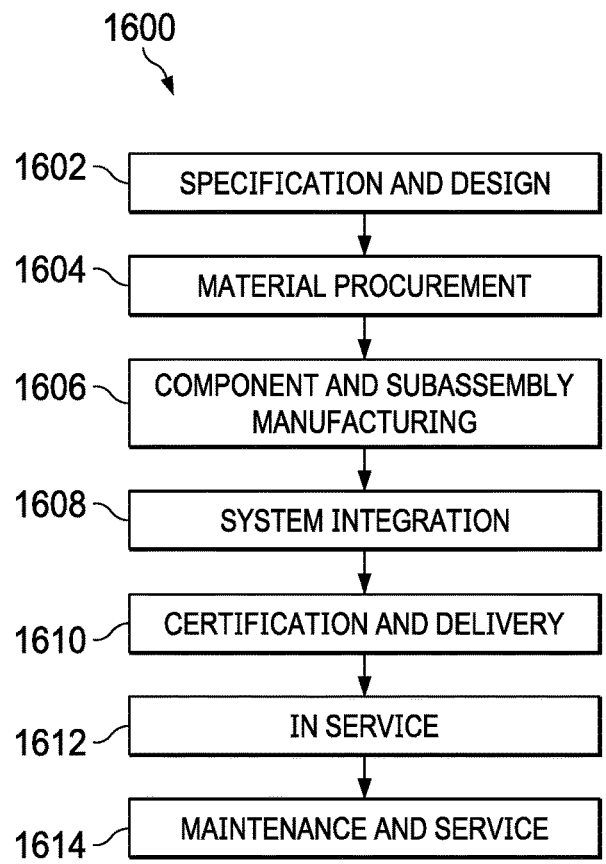
FIG. 16 is an illustration of a block diagram of an aircraft manufacturing and service method in accordance with an illustrative embodiment.
Figure 17:
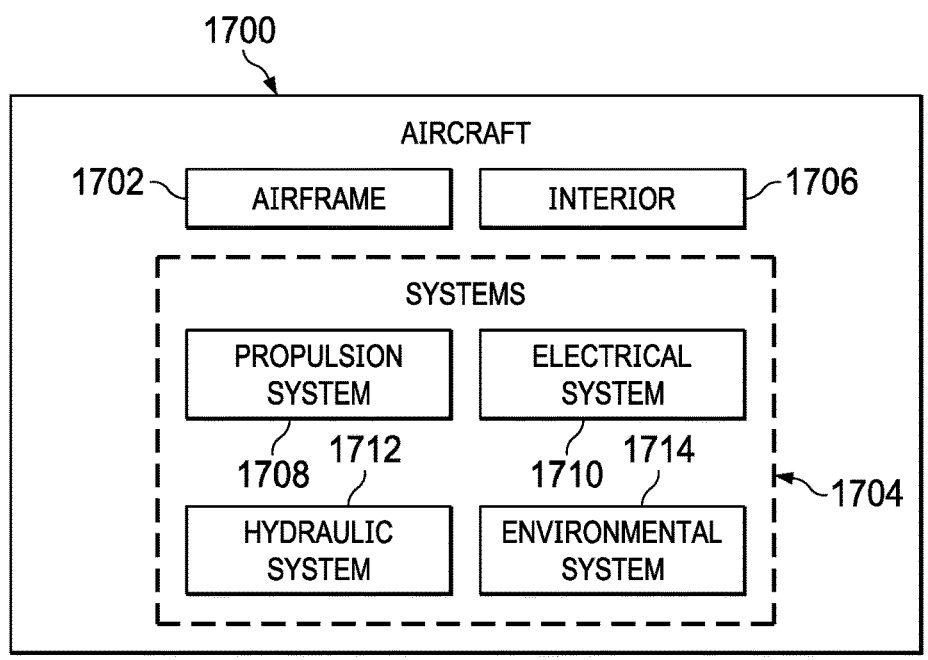
FIG. 17 is an illustration of a block diagram of an aircraft in which an illustrative embodiment may be implemented.

Illustrative embodiments of the disclosure may be described in the context of aircraft manufacturing and service method 1600 as shown in FIG. 16 and aircraft 1700 as shown in FIG. 17. Turning first to FIG. 16, an illustration of a block diagram of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Composite repair system 100 from FIG. 2 may be used repair composite structure 102 prior to component and subassembly manufacturing 1606. In addition, composite repair system 100 may be used to repair composite structure 102 during routine maintenance and service 1614 as part of a modification, reconfiguration, or refurbishment of aircraft 1700 in FIG. 17.

Each of the processes of aircraft manufacturing and service method 1600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 17, an illustration of a block diagram of an aircraft in which an illustrative embodiment may be implemented is depicted in accordance with an illustrative embodiment. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612, during maintenance and service 1614 in FIG. 16, or both. The use of a number of the different illustrative embodiments may substantially expedite the assembly of aircraft 1700, reduce the cost of aircraft 1700, or both expedite the assembly of aircraft 1700 and reduce the cost of aircraft 1700.

With the use of an illustrative embodiment, composite parts may be more repaired more easily and quickly than with currently used manual processes and are less prone to human error. The illustrative embodiments supply a repeatable rework scenario for parts that are manufactured in the same manner and are prone to defects in the same areas of each part. Human operators take on a more supervisory role, rather than hands-on technician role, in manufacturing these structures.

Automated scarfing ensures that a desired taper ratio is maintained throughout the process without the ergonomic challenges faced by human technicians. The automated scarfing tool may be implemented in traditional gantry systems or robots that may travel around the manufacturing floor in an unmanned vehicle, on tracks, or in some other manner. Cost savings are realized because fewer parts will need to be scrapped.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for repairing a composite structure, the method comprising:
defining a rework zone on the composite structure;
identifying a rectangular shaped theoretical scarfing bottom surface for the rework zone from a model of the composite structure;
selecting a scarf repair model based on a maximum longitudinal distance between two extremities of the composite structure and an aspect ratio of the rework zone, wherein the aspect ratio of the rework zone is a ratio of a width of a longitudinal edge of the rework zone and the maximum longitudinal distance between the two extremities of the composite structure;
identifying an actual scarfing bottom surface in a local axis system for the rework zone;
modifying parameters for a rework program for an automated scarfing tool based on deviations between the theoretical scarfing bottom surface and the actual scarfing bottom surface; and
removing plies in the rework zone using the automated scarfing tool.

2. The method of claim 1, wherein identifying the actual scarfing bottom surface comprises:
transforming a theoretical rework program for the theoretical scarfing bottom surface from a global axis system to the local axis system in the rework zone; and
identifying the deviations between the theoretical scarfing bottom surface and the actual scarfing bottom surface.

3. The method of claim 2, wherein identifying the deviations comprises:
cutting reference lines on a tool side surface of the composite structure parallel to all four edges of the theoretical scarfing bottom surface until all four of the edges are cut at a same depth.

4. The method of claim 3, wherein identifying the deviations comprises:
rotating a cutting plane of the automated scarfing tool about the local axis system until all four of the edges are marked such that the cutting plane is parallel to a tool side surface of the composite structure.

5. The method of claim 4, wherein identifying the deviations further comprises:
translating the cutting plane of the automated scarfing tool about the local axis system until all four of the edges are marked such that the cutting plane is parallel to the tool side surface of the composite structure.

6. The method of claim 5, wherein modifying the parameters comprises:
transforming the modified theoretical rework program from the local axis system to the global axis system to create an actual rework program.

7. The method of claim 1 further comprising:
identifying a defect in the composite structure; and
defining the rework zone based on features of the defect.

8. The method of claim 1, wherein when the aspect ratio is equal to or smaller than 1:10, a first scarf repair model is selected and wherein when the aspect ratio is larger than 1:10, a second scarf repair model is selected.

9. The method of claim 1, wherein removing the plies comprises:
removing the plies with the automated scarfing tool in a 30:1-60:1 tapered ratio.

10. The method of claim 8, wherein the second scarf model is selected, the method further comprising:
separating the rework zone into sections; and
modifying the parameters of the rework program in each of the sections.

11. A composite repair system comprising:
an automated scarfing tool configured to remove plies in a rework zone of a composite structure;
a database comprising a model of the composite structure having a rectangular shaped theoretical scarfing bottom surface;
a computer system configured to select a scarf repair model based on a maximum longitudinal distance between two extremities of the composite structure and an aspect ratio of the rework zone, wherein the aspect ratio of the rework zone is a ratio of a width of a longitudinal edge of the rework zone and the maximum longitudinal distance between the two extremities of the composite structure; and
the computer system further configured to identify an actual scarfing bottom surface in a local axis system for the rework zone and modify parameters for a rework program for the automated scarfing tool based on deviations between the theoretical scarfing bottom surface and the actual scarfing bottom surface;
wherein the automated scarfing tool is further configured to cut reference lines on a tool side surface of the composite structure parallel to all four edges of the theoretical scarfing bottom surface until all four of the edges are cut at a same depth.

12. The composite repair system of claim 11 further comprising:
an inspection system configured to identify a defect in the composite structure.

13. The composite repair system of claim 11 further comprising:
a controller configured to control movement of the automated scarfing tool such that the controller can adjust a cutting plane for the automated scarfing tool by rotating the automated scarfing tool and translating the automated scarfing tool along the local axis system until the cutting plane is parallel to the actual scarfing bottom surface.

14. The composite repair system of claim 11 further comprising:
a measurement system configured to measure reference locations in the rework zone.

15. The composite repair system of claim 11 further comprising:
a vision system configured to collect image data for the rework zone.

16. A method for repairing a composite structure, the method comprising:
defining a rework zone on the composite structure;
selecting a scarf repair model based on a maximum longitudinal distance between two extremities of the composite structure and an aspect ratio of the rework zone, wherein the aspect ratio of the rework zone is a ratio of a width of a longitudinal edge of the rework zone and the maximum longitudinal distance between the two extremities of the composite structure;
separating the rework zone into sections;
identifying a theoretical scarfing bottom surface for each of the sections of the rework zone from a model of the composite structure;
measuring reference locations in each of the sections of the rework zone;
identifying an actual scarfing bottom surface for each of the sections of the rework zone based on measurements collected at the reference locations;
modifying parameters for a rework program for an automated scarfing tool based on deviations between the measurements collected at the reference locations; and
removing plies in each of the sections of the rework zone using the automated scarfing tool.

17. The method of claim 16 further comprising:
separating the rework zone into the sections based on a determination that the aspect ratio is greater than 1:10.

18. The method of claim 16, wherein measuring the reference locations comprises:
cutting a primary reference location in each of the sections of the rework zone;
probing the primary reference location to determine the actual scarfing bottom surface in each of the sections; and
modifying a tool path for the rework program based on the deviations between the actual scarfing bottom surface and the theoretical scarfing bottom surface.

19. The method of claim 18, wherein measuring the reference locations further comprises:
cutting a number of secondary reference locations in each of the sections of the rework zone;
probing the number of secondary reference locations to determine the deviations caused by the automated scarfing tool; and
modifying the tool path for the automated scarfing tool based on the deviations in measurement between the number of secondary reference locations.

20. The method of claim 16 further comprising:
identifying a defect in the composite structure; and
defining the rework zone based on features of the defect.

\* \* \* \* \*